(12) United States Patent
Zaitseva et al.

(10) Patent No.: US 9,650,564 B2
(45) Date of Patent: May 16, 2017

(54) SYSTEM AND PLASTIC SCINTILLATOR FOR DISCRIMINATION OF THERMAL NEUTRON, FAST NEUTRON, AND GAMMA RADIATION

(75) Inventors: Natalia P. Zaitseva, Livermore, CA (US); M. Leslie Carman, San Ramon, CA (US); Michelle A. Faust, Woodland, CA (US); Andrew M. Glenn, Livermore, CA (US); H. Paul Martinez, Livermore, CA (US); Iwona A. Pawelczak, Livermore, CA (US); Stephen A. Payne, Castro Valley, CA (US); Keith E. Lewis, Escalon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1268 days.

(21) Appl. No.: 13/471,259

(22) Filed: May 14, 2012

(65) Prior Publication Data
US 2013/0299702 A1    Nov. 14, 2013

(51) Int. Cl.
*G01T 1/20*     (2006.01)
*C09K 11/06*    (2006.01)
(Continued)

(52) U.S. Cl.
CPC ............... *C09K 11/06* (2013.01); *G01T 1/203* (2013.01); *G01T 3/06* (2013.01); *G21K 4/00* (2013.01)

(58) Field of Classification Search
CPC ...................................... G01T 3/06
(Continued)

(56) References Cited

U.S. PATENT DOCUMENTS 3,116,417 A    12/1963   Orr et al.
3,750,046 A     7/1973   Buehler et al.
(Continued)

FOREIGN PATENT DOCUMENTS

EP        129364 A2      12/1984
EP      0 352 952 A2      1/1990
(Continued)

OTHER PUBLICATIONS

Fisher et al., "Fast neutron detection with 6Li-loaded liquid scintillator," 2011, Nuclear Instruments and Methods in Physics Research A, vol. 646, pp. 126-134.*
(Continued)

*Primary Examiner* — Kiho Kim
(74) *Attorney, Agent, or Firm* — Zilka-Kotab, PC

(57) ABSTRACT

A scintillator material according to one embodiment includes a polymer matrix; a primary dye in the polymer matrix, the primary dye being a fluorescent dye, the primary dye being present in an amount of 3 wt % or more; and at least one component in the polymer matrix, the component being selected from a group consisting of B, Li, Gd, a B-containing compound, a Li-containing compound and a Gd-containing compound, wherein the scintillator material exhibits an optical response signature for thermal neutrons that is different than an optical response signature for fast neutrons and gamma rays. A system according to one embodiment includes a scintillator material as disclosed herein and a photodetector for detecting the response of the material to fast neutron, thermal neutron and gamma ray irradiation.

18 Claims, 14 Drawing Sheets

(51) Int. Cl.
  *G01T 1/203* (2006.01)
  *G01T 3/06* (2006.01)
  *G21K 4/00* (2006.01)

(58) Field of Classification Search
  USPC .................................................. 250/361 R
  See application file for complete search history.

(56) References Cited

U.S. PATENT DOCUMENTS

| | | | |
|---|---|---|---|
| 3,817,633 A | 6/1974 | White | |
| 3,886,082 A | 5/1975 | Hyman, Jr. | |
| 3,988,586 A | 10/1976 | Stuart et al. | |
| 4,127,499 A * | 11/1978 | Chen et al. | 252/301.17 |
| 4,482,808 A | 11/1984 | Tominaga et al. | |
| 4,522,742 A | 6/1985 | Lee et al. | |
| 4,578,213 A | 3/1986 | Simonetti | |
| 4,652,532 A * | 3/1987 | Bain et al. | 436/501 |
| 4,692,266 A * | 9/1987 | Costa et al. | 252/301.17 |
| 4,718,417 A | 1/1988 | Kittrell et al. | |
| 4,930,516 A | 6/1990 | Alfano et al. | |
| 4,957,114 A | 9/1990 | Zeng et al. | |
| 4,957,144 A | 9/1990 | Watanabe et al. | |
| 5,042,494 A | 8/1991 | Alfano | |
| 5,110,500 A * | 5/1992 | Walker | G01T 1/203 252/301.16 |
| 5,131,398 A | 7/1992 | Alfano et al. | |
| 5,261,410 A | 11/1993 | Alfano et al. | |
| 5,313,306 A | 5/1994 | Kuban et al. | |
| 5,348,018 A | 9/1994 | Alfano et al. | |
| 5,436,655 A | 7/1995 | Hiyama et al. | |
| 5,467,767 A | 11/1995 | Alfano et al. | |
| 5,474,816 A | 12/1995 | Falabella | |
| 5,593,879 A | 1/1997 | Steller et al. | |
| 5,606,638 A | 2/1997 | Tymianski et al. | |
| 5,726,453 A | 3/1998 | Lott et al. | |
| 5,769,081 A | 6/1998 | Alfano et al. | |
| 5,833,596 A | 11/1998 | Bonnell et al. | |
| 5,847,394 A | 12/1998 | Alfano et al. | |
| 5,872,363 A | 2/1999 | Bingham et al. | |
| 5,940,460 A | 8/1999 | Seidel et al. | |
| 5,949,069 A | 9/1999 | Chace et al. | |
| 5,975,899 A | 11/1999 | Badoz et al. | |
| 5,976,076 A | 11/1999 | Kolff et al. | |
| 5,997,472 A | 12/1999 | Bonnell et al. | |
| 6,169,289 B1 | 1/2001 | White et al. | |
| 6,255,657 B1 | 7/2001 | Cole et al. | |
| 6,269,169 B1 | 7/2001 | Funk et al. | |
| 6,413,267 B1 | 7/2002 | Dumoulin-White et al. | |
| 6,462,770 B1 | 10/2002 | Cline et al. | |
| 6,477,403 B1 | 11/2002 | Eguchi et al. | |
| 6,529,769 B2 | 3/2003 | Zigler | |
| 6,544,442 B1 * | 4/2003 | Bell et al. | 252/478 |
| 6,598,428 B1 | 7/2003 | Cryan et al. | |
| 6,687,000 B1 | 2/2004 | White | |
| 6,730,019 B2 | 5/2004 | Irion | |
| 6,775,567 B2 | 8/2004 | Cable et al. | |
| 6,817,633 B2 | 11/2004 | Brill et al. | |
| 6,949,069 B2 | 9/2005 | Farkas et al. | |
| 6,975,898 B2 | 12/2005 | Seibel | |
| 6,975,899 B2 | 12/2005 | Faupel et al. | |
| 7,003,147 B2 | 2/2006 | Inoue | |
| 7,016,717 B2 | 3/2006 | Demos et al. | |
| 7,067,079 B2 | 6/2006 | Bross et al. | |
| 7,145,149 B2 | 12/2006 | Cooke et al. | |
| 7,164,138 B2 | 1/2007 | McGregor et al. | |
| 7,172,553 B2 | 2/2007 | Ueno et al. | |
| 7,257,437 B2 | 8/2007 | Demos et al. | |
| 7,372,041 B1 | 5/2008 | Nagarkar et al. | |
| 7,723,114 B1 * | 5/2010 | Coates et al. | 436/57 |
| 7,857,993 B2 | 12/2010 | Dai et al. | |
| 7,863,579 B2 | 1/2011 | Suhami | |
| 7,930,516 B1 | 4/2011 | Jin et al. | |
| 7,945,077 B2 | 5/2011 | Demos | |
| 8,177,998 B2 | 5/2012 | Dai et al. | |
| 8,205,707 B2 | 6/2012 | Yamamoto et al. | |
| 8,207,507 B2 | 6/2012 | Zaitseva et al. | |
| 8,208,507 B2 | 6/2012 | Lerner et al. | |
| 8,285,015 B2 | 10/2012 | Demos | |
| 8,314,399 B2 | 11/2012 | Clothier et al. | |
| 8,461,546 B2 | 6/2013 | Payne et al. | |
| 8,580,054 B2 | 11/2013 | Pagoria et al. | |
| 8,584,950 B2 | 11/2013 | Endo et al. | |
| 8,735,843 B2 | 5/2014 | Payne et al. | |
| 8,872,125 B2 | 10/2014 | Zaitseva et al. | |
| 9,274,237 B2 | 3/2016 | Zaitseva et al. | |
| 9,309,456 B2 | 4/2016 | Zaitseva et al. | |
| 2001/0030744 A1 | 10/2001 | Chang | |
| 2002/0103439 A1 | 8/2002 | Zeng et al. | |
| 2003/0158470 A1 | 8/2003 | Wolters et al. | |
| 2003/0232445 A1 | 12/2003 | Fulghum, Jr. | |
| 2004/0019281 A1 | 1/2004 | Weber et al. | |
| 2004/0175383 A1 | 9/2004 | Barr et al. | |
| 2005/0020926 A1 | 1/2005 | Wiklof et al. | |
| 2005/0208290 A1 * | 9/2005 | Patel | 428/323 |
| 2006/0054863 A1 * | 3/2006 | Dai et al. | 252/301.4 R |
| 2006/0086311 A1 | 4/2006 | Zagumennyi et al. | |
| 2006/0131589 A1 * | 6/2006 | Caruso et al. | 257/77 |
| 2006/0138340 A1 * | 6/2006 | Ianakiev et al. | 250/390.01 |
| 2006/0255282 A1 | 11/2006 | Nikolic et al. | |
| 2007/0160279 A1 | 7/2007 | Demos | |
| 2007/0175383 A1 | 8/2007 | Fukuda et al. | |
| 2008/0017804 A1 | 1/2008 | Krishnamoorthy et al. | |
| 2008/0145338 A1 * | 6/2008 | Anderson et al. | 424/93.1 |
| 2008/0178904 A1 | 7/2008 | Peters | |
| 2008/0267472 A1 | 10/2008 | Demos | |
| 2008/0275171 A1 | 11/2008 | Song et al. | |
| 2009/0023830 A1 * | 1/2009 | Imai | 522/74 |
| 2010/0252741 A1 | 10/2010 | Zaitseva et al. | |
| 2010/0256923 A1 | 10/2010 | Payne et al. | |
| 2011/0266643 A1 | 11/2011 | Engelmann et al. | |
| 2011/0284755 A1 | 11/2011 | Stradins et al. | |
| 2012/0043632 A1 | 2/2012 | Nikolic et al. | |
| 2012/0132819 A1 | 5/2012 | Climent | |
| 2012/0241630 A1 * | 9/2012 | Walker et al. | 250/362 |
| 2012/0317791 A1 | 12/2012 | Frank | |
| 2012/0326042 A1 | 12/2012 | Zaitseva et al. | |
| 2013/0033589 A1 | 2/2013 | Demos | |
| 2013/0099125 A1 | 4/2013 | Grodzins | |
| 2013/0168566 A1 | 7/2013 | Blackburn et al. | |
| 2013/0175340 A1 | 7/2013 | Endo et al. | |
| 2013/0181135 A1 | 7/2013 | Payne | |
| 2013/0187056 A1 | 7/2013 | Nikolic et al. | |
| 2013/0263982 A1 | 10/2013 | Pagoria et al. | |
| 2014/0027646 A1 | 1/2014 | Zaitseva et al. | |
| 2014/0291532 A1 | 10/2014 | Payne et al. | |
| 2015/0028217 A1 | 1/2015 | Zaitseva et al. | |

FOREIGN PATENT DOCUMENTS

| | | |
|---|---|---|
| GB | 2254417 A | 10/1992 |
| SU | 1780423 A1 * | 11/1994 |
| WO | 0238040 A2 | 5/2002 |
| WO | 201214265 A1 | 2/2012 |
| WO | 2012/142365 A2 | 10/2012 |

OTHER PUBLICATIONS

Peurrung, A. J., "Recent developments in neutron detection," 2000 Elsevier Science B.V., Nuclear Instruments and Methods in Physics Research A, vol. 443, 2000, pp. 400-415.

Brooks, F. D., "Development of Organic Scintillators," North-Holland Publishing Co., Nuclear Instruments and Methods, vol. 162, 1979, pp. 477-505.

Vijayan et al., "Growth, optical, thermal and mechanical studies of methyl 4-hydroxybenzoate single crystals," 2003 Elsevier B.V., Journal of Crystal Growth, vol. 256, 2003, pp. 174-182.

Varfolomeeva, V. N., et al., "Polarization Diagrams for the Fluorescence of Single Crystals of Salicylic Acid and Salicylates," Soviet Physics—Crystallography, vol. 13, No. 2, Sep.-Oct. 1968, pp. 209-211.

Mandshukov, I. G., et al., "Properties of a New Class of Organic Scintillators: Derivatives of Salicyclic Acid," 1982 Plenum Pub-

(56) References Cited

OTHER PUBLICATIONS lishing Corporation, University of Sofia, Bulgaria, Translated from Pribory i Tekhnika Eksperimenta, No. 3, May-Jun. 1981, pp. 605-611.
Zhao et al., "Characteristics of large-sized Ce:YAG Scintillation crystal grown by temperature gradient technique," 2003 Elsevier B.V., Journal of Crystal Growth, vol. 253, 2003, pp. 290-296.
Non-Final Office Action from U.S. Appl. No. 12/418,434 dated May 20, 2011.
Non-Final Office Action from U.S. Appl. No. 12/418,434 dated Nov. 22, 2011.
Notice of Allowance and Fee(s) Due from U.S. Appl. No. 12/418,434 dated Feb. 23, 2012.
Non-Final Office Action from U.S. Appl. No. 12/418,450 dated Jul. 13, 2011.
Non-Final Office Action from U.S. Appl. No. 12/418,450 dated Nov. 15, 2011.
Final Office Action from U.S. Appl. No. 12/418,450 dated Feb. 24, 2012.
Notice of Allowance and Fee(s) Due from U.S. Appl. No. 12/418,450 dated Oct. 22, 2012.
Non-Final Office Action from U.S. Appl. No. 13/736,898 dated Mar. 8, 2013.
Zaitseva et al., "Plastic scintillators with efficient neutron/gamma pulse shape discrimination," Nuclear Instruments and Methods in Physics Research A, vol. 668, 2012, pp. 88-93.
Brooks, F.D., "A Scintillation Counter with Neutron and Gamma-Ray Discriminators," Nuclear Instruments and Methods, vol. 4, 1995, pp. 151-163.
Final Office Action from application U.S. Appl. No. 13/437,836 dated May 22, 2014.
Notice of Allowance and Fee(s) Due from application U.S. Appl. No. 13/477,910 dated Apr. 16, 2014.
U.S. Appl. No. 13/742,298, filed Jan. 15, 2013.
U.S. Appl. No. 13/601,918, filed Aug. 31, 2012.
U.S. Appl. No. 13/437,836, filed Apr. 2, 2012.
U.S. Appl. No. 13/439,780, filed Apr. 4, 2012.
Restriction/Election Requirement from U.S. Appl. No. 12/167,104 dated Jun. 8, 2011.
Non-Final Office Action from U.S. Appl. No. 12/167,104 dated Sep. 15, 2011.
Final Office Action from U.S. Appl. No. 12/167,104 dated Feb. 23, 2012.
Notice of Allowance and Fee(s) Due from U.S. Appl. No. 12/167,104 dated Jun. 21, 2012.
Udagawa et al., "Aberrant Porphyrin Metabolism in Hepatocellular Carcinoma," 1984 Academic Press, Inc., Biochemical Medicine, vol. 31, pp. 131-139.
Pitts et al., "Autofluorescene characteristics of immortalized and carcinogen-transformed human bronchial epithelial cells," 2001 SPIE, Journal of Biomedical Optics, vol. 6, No. 1, Jan. 2001, pp. 31-40.
Zawirska, B., "Comparative Porphyrin Content in Tumors with Contiguous Non-Neoplastic Tissues," 1979, Neoplasma, vol. 26, No. 2, pp. 223-229.
Malik et al., "Destruction of Erythroleukaemic Cells by Photoactivation of Endogenous Porphyrins," The Macmillan Press Ltd., 1987, Br. J. Cancer, 1987, vol. 56, pp. 589-595.
Zhang et al., "Far-red and NIR Spectral Wing Emission from Tissues under 532 and 632 nm Photo-excitation," 1999 OPA, Lasers in the Life Sciences, vol. 9, pp. 1-16.
Alfano et al., "Laser Induced Fluorescence Spectroscopy from Native Cancerous and Normal Tissue," 1984 IEEE, IEEE Journal of Quantum Electronics, vol. QE-20, No. 12, Dec. 1984, pp. 1507-1511.
Navone et al., "Heme Biosynthesis in Human Breast Cancer-Mimetic "In Vitro" Studies and Some Heme Enzymic Activity Levels," 1990 Pergamon Press Pic, International Journal on Biochemistry, vol. 22, No. 12, pp. 1407-1411.
Richards-Kortum et al., "Spectroscopic Diagnosis of Colonic Dysplasia," 1991 Pergamon Press Pic, Photochemistry and Photobiology, vol. 53, No. 6, pp. 777-786.
Demos et al., "Subsurface Imaging Using the Spectral Polarization Difference Technique and NIR Illumination," Part of the SPIE Conference on Optical Tomography and Spectroscopy of Tissue III, Jan. 1991, SPIE 3597, pp. 406-410.
Demos et al., "Tissue Imaging for Cancer Detection Using NIR Autofluorescence," 2002 SPIE, Optical Biopsy IV, Proceedings of SPIE, vol. 4613, pp. 31-34.
Corle et al., "Chapter 2—Instruments," Confocal Scanning Optical Microscopy and Related Imaging Systems, 1996, pp. 67-145.
Notice of Allowance and Fee(s) Due from U.S. Appl. No. 13/439,780 dated Jul. 31, 2013.
Anutgan et al., "Effect of heat treatment on the stress and structure evolution of plasma deposited boron nitride thin films," Surface & Coatings Technology, vol. 202, 2008, pp. 3058-3066.
Dusane, R. O., "Opportunities for new materials synthesis by hot wire chemical vapor process," Thin Solid Films, vol. 519, 2011, pp. 4555-4560.
Lattemann et al., "New approach in depositing thick, layered cubic boron nitride coatings by oxygen addition structural and compositional analysis," Thin Solid Films, vol. 515, 2006, pp. 1058-1062.
Bello et al., "Deposition of thick cubic boron nitride films: The route to practical applications," Diamond & Related Materials, vol. 14, 2005, pp. 1154-1162.
He et al., "Improvement of adhesion of cubic boron nitride filsm: effect of interlayer and deposition parameters," Materials Science Forum, vols. 475-479, 2005, pp. 3637-3638.
Shultis et al., "Efficiencies of Coated and Perforated Semiconductor Neutron Detectors," 2004 IEEE, pp. 4569-4574.
McGregor et al., "New Surface Morphology for Low Stress Thin-Film-Coated Thermal Neutron Detectors," 2002 IEEE, IEEE Transactions on Nuclear Science, vol. 49, No. 4, Aug. 2002, pp. 1999-2004.
Matsumoto et al., "The introducing of fluorine into the deposition of BN: a successful method to obtain high-quality, thick cBN films with low residual stress," Diamond and Related Materials, vol. 10, 2001, pp. 1868-1874.
Karim et al., "Effect of deposition parameters on the formation of cubic BN films deposited by plasma-assisted chemical vapour deposition from non-toxic material," Surface and Coatings Technology, vol. 54-55, 1992, pp. 355-359.
Bell et al., "Gadolinium- and Boron-Loaded Organic Scintillators for Neutron Detection," Transactions of the American Nuclear Society, vol. 83, 2000, pp. 259-260.
Carturan et al., "Novel Polysiloxane-Based Scintillators for Neutron Detection," Radiation Protection Dosimetry, vol. 143, No. 2-4, 2011, pp. 471-476.
Koshimizu et al., "Organic-Inorganic Hybrid Scintillator for Neutron Detection Fabricated by Sol-Gel Method," Japanese Journal of Applied Physics, vol. 47, No. 7, 2008, pp. 5717-5719.
Brown et al., "Applications of Nanoparticles in Scintillation Detectors," Antiterrorism and Homeland Defence: Polymers and Materials, American Chemical Society, vol. 980, 2008, pp. 117-129.
Binder et al., "Preparation and Investigation of a Pulse Shape Discrimination Plastic," Erkezett:, vol. 14, Dec. 10, 1965, pp. 457-461 (non-translated).
Kim et al., "Performance of Hybrid Plastic Scintillator Detectors for Low-Energy Neutron Measurements," Journal of the Korean Physical Society, vol. 52, No. 3, Mar. 2008, pp. 908-912.
Normand et al., "Discrimination methods between neutron and gamma rays for boron loaded plastic scintillators," Nuclear Instruments & Methods in Physics Research A, vol. 484, 2002, pp. 342-350.
Quaranta et al., "Optical and Scintillation Properties of Polydimethyl-Diphenylsiloxane Based Organic Scintillators," IEEE Transactions on Nuclear Science, vol. 57, No. 2, Apr. 2010, pp. 891-900.
Quaranta et al., "Doping of polysiloxane rubbers for the production of organic scintillators," Optical Materials, vol. 32, No. 10, 2010, pp. 1317-1320.

(56) References Cited

OTHER PUBLICATIONS

Hull et al., "New Organic Crystals for Pulse Shape Discrimination," IEEE Transactions on Nuclear Science, vol. 56, No. 3, Jun. 2009, pp. 899-903.

Iwanowska et al., "Composite Scintillators as Detectors for Fast Neutrons and Gamma-Radiation Detection in the Border Monitoring," 2009 IEEE Nuclear Science Symposium Conference Record, pp. 1437-1440.

Hamel et al., "Fluorescent 1,8-naphthalimides-containing polymers as plastic scintillators. An attempt for neutron-gamma discrimination," Reactive & Functional Polymers, vol. 68, No. 12, 2008, pp. 1671-1681.

Kim et al., "Characteristics of Hybrid Plastic Scintillators for Slow Neutron Measurements," 2007 IEEE Nuclear Science Symposium Conference Record, pp. 1971-1975.

Katagiri et al., "Scintillation materials for neutron imaging detectors," Nuclear Instruments & Methods in Physics Research A, vol. 529, 2004, pp. 274-279.

Gervino et al., "A low background, large solid angle neutron detector for spectroscopy and dosimetry application." Sensors and Actuators A, vol. 41-42, 1994, pp. 497-502.

Kubota et al., "A New Solid State Neutron Detector: Particle Identification With a Barium-Fluoride Plastic Scintillator." Nuclear Instruments & Methods in Physics Research, vol. A270, 1998, pp. 598-601.

Final Office Action from U.S. Appl. No. 13/736,898 dated Jun. 24, 2013.

On Line Product Catalog, down-loaded on Jun. 18, 2013, "Tri-Garb 2910 TR Liquid Scintillation Analyzer," PerkinElmer.

Non-Final Office Action from U.S. Appl. No. 12/418,450 dated Jun. 14, 2012.

Wang et al., "Morphological instability of crystals grown from thin aqueous solution films with a free surface," 1995, Philosophical Magazine A, vol. 71, No. 2, pp. 409-419.

Sangster et al., "Study of Organic Scintillators," The Journal of Chemical Physics, vol. 24, No. 4, Apr. 1956, pp. 670-715.

Greenwood et al., "Li-Salicylate Neutron Detectors with Pulse Shape Discrimination," Nuclear Instruments and Methods, vol. 165, 1979, pp. 129-131.

Schomacker et al., "Ultraviolet Laser-Induced Fluorescence of Colonic Tissue: Basic Biology and Diagnostic Potential," Lasers in Surgery and Medicine, vol. 12, 1992, pp. 63-78.

Breukers et al., "Transparent lithium loaded plastic scintillators for thermal neutron detection," Nuclear Instruments and Methods in Physics Research A, vol. 701, 2013, pp. 58-61.

Britvich et al., "New Polystyrene-Based Scintillators," Instruments and Experimental Techniques, vol. 45, No. 5, 2002, pp. 644-654.

Fisher et al., "Fast neutron detection with 6Li-loaded liquid scintillator," Nuclear Instruments and Methods in Physics Research A, vol. 646, 2011, pp. 126-134.

Im et al., "Scintillators for Alpha and Neutron Radiations Synthesized by Room Temperature Sol-Gel Processing," Journal of Sol-Gel Science and Technology, vol. 32, 2004, pp. 117-123.

Im et al., "Transparent matrix structures for detection of neutron particles based on di-ureasil xerogels," Applied Physics Letters, vol. 84, No. 13, Mar. 29, 2004, pp. 2448-2450.

Im et al., "Transparent Solid-State Lithiated Neutron Scintillators Based on Self-Assembly of Polystyrene-block-poly (ethylene oxide) Copolymer Architectures," Advanced Material, vol. 16, No. 19, Oct. 4, 2004, pp. 1757-1761.

Katagiri et al., "Neutronly-ray discrimination characteristics of novel neutron scintillators," Nuclear Instruments and Methods in Physics Research A, vol. 529, 2004, pp. 317-320.

Kazkaz et al., "Comparison of Lithium Gadolinium Borate Crystal Grains in Scintillating and Nonscintillating Plastic Matrices," IEEE Transactions on Nuclear Science, vol. 60, No. 2, Apr. 2013, pp. 1416-1426.

Kesanli et al., "Highly efficient solid-state neutron scintillators based on hybrid sol-gel nanocomposite materials," Applied Physics Letters, vol. 89, 2006, pp. 214104/1-214104/3.

Negina et al., "Plastic Scintillation of Increased Transparency Containing 6Li," Translated from Pribory i Tekhnika Eksperimenta, No. 5, Sep.-Oct. 1980, pp. 60-62.

Sen et al., "Thermal Neutron Scintillator Detectors Based on Poly (2-Vinylnaphthalene) Composite Films," IEEE Transactions on Nuclear Science, vol. 58, No. 3, Jun. 2011, pp. 1386-1393.

Sen et al., "Polyester Composite Thermal Neutron Scintillation Films," IEEE Transactions on Nuclear Science, vol. 59, No. 4, Aug. 2012, pp. 1781-1786.

Zaitseva et al., "Pulse shape discrimination with lithium-containing organic scintillators," Nuclear Instruments and Methods in Physics Research A, vol. 729, 2013, pp. 747-754.

Advisory Action from U.S. Appl. No. 13/736,898 dated Dec. 9, 2013.

Notice of Allowance and Fee(s) Due from U.S. Appl. No. 13/736,898 dated Jan. 13, 2014.

Andrianov et al., "Synthesis and Properties of 4-Amino-3-Cyanofurazan," Chemistry of Heterocyclic Compounds, vol. 30, No. 5, 1994, pp. 608-611.

Bryan et al., "Fast Neutron—Gamma Pulse Shape Discrimination of Liquid Scintillation Signals for Time Correlated Measurements," 2003 IEEE Nuclear Science Symposium Conference Record, Oct. 19-25, 2003, pp. 1-5.

Grudskaya, L.E., "Plastic Scintillators for Seperation of Particles by Pulse Shape," Monokristally I Tekhnika, vol. 3, 1968, pp. 153-156.

International Preliminary Report and Written Opinion from PCT Application No. PCTUS2012033449 dated Oct. 24, 2013.

Jhingan et al, "Simple Ways of n-y Discrimination Using Charge Comparison Technique," ScienceDirect, Nuclear Instruments and Methods in Physics Research A 585 (2008) 165-171.

Lawrence Livermore National Laboratory, "Laboratory Directed Research and Development, FY2007 Annual Report".

Nikolic et al., "6.1 aspect ratio silicon pillar based thermal neutron detector filled with 10B," Applied Physics Letters 93, 2008, pp. 133502-1-133502-3.

Nikolic et al., "Fabrication of pillar-structured thermal neutron detectors," IEEE Nuclear Science Symposium Conference Record, 2007, pp. 1577-1580.

Nikolic et al., "Si pillar structed thermal neutron detectors: fabrication challenges and performance expectations," Lawrence livermore national laboratory, LLNL-PROC-480809, 2011, pp. 1-13.

Non-Final Office Action from U.S. Appl. No. 13/437,836, dated Nov. 7, 2013.

Notice of Allowance from U.S. Appl. No. 13/439,780, dated Jun. 12, 2013.

Restriction Requirement from U.S. Appl. No. 13/439,780, dated Mar. 28, 2013.

Sellin et al., "Digital Pulse Shape Discrimination Applied to Capture-Gated Neutron Detectors," Department of Physics, University of Surrey, Guildford, UK, pp. 1-18.

Shaposhnikov et al., "New Heterocycles with a 3-Aminofurazanyl Substituent," Russian Journal of Organic Chemistry, vol. 38, No. 9, 2002, pp. 1351-1355.

Soderstrom et al., "Digital Pulse-Shape Discrimination of Fast Neutrons and y Rays," ScienceDirect, Nuclear Instruments and Methods in Physics Research A 594, 2008, pp. 79-89.

Demos, S.G., U.S. Appl. No. 11/292,406, filed Nov. 30, 2005.

Yarovenko et al., "15N NMR study of the mechanism of the reaction of amidoximes with nitriles in the presence of ZnCl2 and HCl," 1995 Plenum Publishing Corporation, Russian Chemical Bulletin, vol. 43, No. 4, 1994, pp. 627-629.

Yarovenko et al., "A convenient synthesis of 3-substituted 5-guanidino-1, 2, 4-Oxadiazoles," 1994 Plenum Publishing Corporation, Russian Chemical Bulletin, vol. 43, No. 1, Jan. 1994, pp. 114-117.

Yarovenko et al., "New Synthesis of 1,2,4-Oxadiazoles," Tetrahedron, vol. 46, No. 11, 1990, pp. 3941-3952.

Yarovenko et al., "Synthesis of 2-amino-5-(5R-1,2,4-Oxadiazolyl)-1, 3,4-Oxadiazoles," 1994 Plenum Publishing Corporation, Russian Chemical Bulletin, vol. 42, No. 12, Dec. 1993, pp. 2014-2017.

(56) References Cited

OTHER PUBLICATIONS

Zaitseva et al., "Neutron detection with single crystal organic scintillators," SPIE Hard X-Ray, Gamma-Ray, and Neutron Detector Physics, Lawrence Livermore National Laboratory, Jul. 20, 2009, pp. 1-10.
Non-Final Office Action from U.S. Appl. No. 13/601,918, dated Feb. 23, 2015.
Non-Final Office Action from U.S. Appl. No. 14/248,951, dated Jan. 20, 2015.
Non-Final Office Action from U.S. Appl. No. 13/742,298, dated Dec. 17, 2014.
Final Office Action from U.S. Appl. No. 13/437,836, dated Jun. 4, 2015.
Final Office Action from U.S. Appl. No. 14/253,754, dated May 1, 2015.
Zaitseva et al., U.S. Appl. No. 14/253,754, filed Apr. 15, 2014.
Non-Final Office Action U.S. Appl. No. 14/253,754, dated Jan. 22, 2015.
Non- Final Office Action U.S. Appl. No. 13/437,836, dated Nov. 17, 2014.
Notice of Allowance from U.S. Appl. No. 13/437,836, dated Sep. 24, 2015.
Abdurashitov,et al., "A high resolution, low background fast neutron spectrometer," Nucl. Instrum. Meth. A, vol. 476, Issues 1-2, Jan. 1, 2002, pp. 318-321.
Bell, Z.W., "Boron-loaded silicone rubber scintillators," IEEE Trans. Nucl. Sci., vol. 51, Issue 4, 2004, pp. 1773-1776.
Bessiere, et al. "Luminescence and scintillation properties of CS 2 LiYCl 6: Ce 3+ for ? and neutron detection," Nuclear Instruments and Methods in Physics Research Section A: Accelerators, Spectrometers, Detectors and Associated Equipment, vol. 537, Issue 1, Jan. 21, 2005, pp. 242-246.
Birowosuto, et al., "Li-Based Thermal Neutron Scintillator Research; and Other Elpasolites," Nuclear Science, IEEE Transactions, vol. 55, Issue 3, Jun. 2008, pp. 1152-1155.
Bollinger, et al., "Measurements of the time dependence of scintillation intensity by a delayed-coincidence method", G.E., Rev. Sci. Instr., vol. 32, Issue 9, 1961, pp. 1044-1050 (published online Dec. 29, 2004).
Brooks et al., "Pulse shape discrimination in plastic scintillators", Nuclear Science, IRE Transactions, NS vol. 7, Issue 2-3, Jun. 1960, pp. 35-38.
Carman, et al., "The effect of material purity on the optical and scintillation properties of solution-grown trans-stilbene crystals," Journal of Crystal Growth, vol. 368, 2013, pp. 56-61.
Flaska, et al., "Digital pulse shape analysis for the capture-gated liquid scintillator BC-523A," Nuclear Instruments and Methods in Physics Research Section A: Accelerators, Spectrometers, Detectors and Associated Equipment, vol. 599, Issue 2, Feb. 11, 2009, pp. 221-225.
Glodo, et al., "Scintillator for Nuclear Monitoring Applications," Nuclear Science, IEEE Transactions, vol. 56, Issue 3, Jun. 2009, pp. 1257-1261.
Greenwood, "6Li-loaded liquid scintillators with pulse shape discrimination," Rev. Sci. Instrum., vol. 50, Issue, 4, 1979, pp. 472-477.
Hansen, et al., "Neutron-gamma discrimination in plastic scintillators", IEEE Trans. Nucl. Sci., vol. 47, Issue 6, Dec. 2000, pp. 2024-2028.
Kiff, et al., "Neutron detection and identification using ZnS:Ag/ 6LiF in segmented antineutrino detectors," Nuclear Instruments & Methods in Physics Research Section A: Accelerators, Spectrometers, Detectors and Associated Equipment and Associated Equipment, vol. 652, Issue 1, Oct. 1, 2011, pp. 412-416.
Nakae, et al., "Recent developments in fast neutron detection and multiplicity counting with liquid scintillator," 2nd Japan IAEA Workshop on Advanced Safeguards Technology for the Future Nuclear Fuel Cycle, Nov. 10, 2009 through Nov. 13, 2009, Tokai, Japan, LLNL Presentation, Publication Jan. 15, 2010, 11 pages.
Nieman et al., "Rapid Triplet Excitation Migration in Organic crystals", J. Chem. Phys., vol. 37, Issue 9, 1962 (published online Jul. 20, 2004), pp. 2150-2151.
Owen R. B., "The decay times of organic scintillators and their application to the discrimination between particles of different specific ionization", I.R.E. Transactions on Nuclear Science, vol. 5, Issue 3, Dec. 1958, pp. 198-201.
Phillips, et al., "Measurements of scintillation lifetimes", Rev. Sci. Instr., vol. 24, Issue 8, 1953 (published online Dec. 29, 2004), pp. 611-616.
Popov, et al., "Lithium glass scintillator neutron detector as an improved alternative to the standard 3 he proportional counter," In Nuclear Science Symposium Conference Record (NSS/MIC), 2010 IEEE, pp. 1819-1822.
Ross et al., "A new liquid scintillator for thermal neutron detection," Nuclear Science and Engineering, vol. 20, Issue 1, Sep. 1964, pp. 23-27.
Runkle, et al., "Securing special nuclear material: Recent advances in neutron detection and their role in nonproliferation," J. Appl. Phys., vol. 108, Issue 11, Dec. 7, 2010, p. 111101-1-111101-21.
Swiderski et al., "Boron-10 loaded BC523A liquid scintillator for neutron detection in the border monitoring," Nuclear Science, IEEE Transactions, vol. 55, Issue 6, 2008, pp. 3710-3716.
Swiderski et al., "Further study of boron-10 loaded liquid scintillators for detection of fast and thermal neutrons." Nuclear Science, IEEE Transactions vol. 57, Issue 1, Feb. 1, 2010, pp. 375-380.
Szczesniak, T., et al. "Light pulse shapes in liquid scintillators originating from gamma-rays and neutrons," Nuclear Science, IEEE Transactions, vol. 57, Issue 6, Dec. 2010, pp. 3846-3852.
Syntfeld, et al., "/sup 6 1Li1 (Eu) in neutron and/spl gamma/-ray spectrometry—a highly sensitive thermal neutron detector," Nuclear Science, IEEE Transactions, vol. 52, Issue 6, Dec. 2005, pp. 3151-3156.
Wang et al., "A feasibility study of boron-loaded liquid scintillator for the detection of electron anti-neutrinos," Nuclear Instruments and Methods in Physics Research Section A: Accelerators, Spectrometers, Detectors and Associated Equipment, vol. 432, Issue 1, Aug. 1, 1999, pp. 111-121.
Winyard, et al., "Pulse shape discrimination in inorganic and organic scintillators", Nucl. Instr. And Meth., vol. 95, Issue 1, 1971, pp. 141-153.
Wright, et al., "Scintillation Decay Times of Organic Crystals", Proc.Phys.Soc.,Section B, vol. 69, Issue 3, Mar. 1, 1956, pp. 358-372.
Zaitseva et al., "Growth and properties of Lithium Salicylate single crystals," Cystal Growth & Design, Lawrence Livermore National Laboratory, Feb. 25, 2009, 14 pages.
Zaitseva et al., "Pulse shape discrimination in impure and mixed single-crystal organic scintillators", IEEE Trans. Nucl. Sci., vol. 58, Issue 6, Apr. 26, 2011, 35 pages.
Zaitseva, et al., "Rapid growth of large-scale (40-55 cm) KH2PO4 Crystal," Journal of Crystal Growth, vol. 180, Issue 2, Dec. 1997, pp. 255-262.
Notice of Allowance from U.S. Appl. No. 14/253,754, dated Aug. 17, 2015.
Notice of Allowance from U.S. Appl. No. 14/253,754, dated Dec. 3, 2015.
Notice of Allowance from U.S. Appl. No. 14/253,754, dated Jan. 11, 2016.
Notice of Allowance from U.S. Appl. No. 13/437,836, dated Jan. 15, 2016.
Zaiteva et al., U.S. Appl. No. 15/063,285, filed Mar. 7, 2016.

* cited by examiner

SYSTEM AND PLASTIC SCINTILLATOR FOR DISCRIMINATION OF THERMAL NEUTRON, FAST NEUTRON, AND GAMMA RADIATION

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to spectroscopy, and more particularly to spectroscopy materials, systems and methods.

BACKGROUND

Radioactive materials are often detected and identified by measuring gamma-rays and/or neutrons emitted from the materials. The energy of gamma-rays is specific to that particular material and acts as a "finger print" to identify the material. Similarly, neutron energy is particular to the material, and may be used to identify the material. Of very high value are detectors capable of identifying the distinctive time-correlated signatures corresponding to neutrons and gamma rays, or "gammas" emitted by fissioning material from within a background of uncorrelated natural radiation. A detector capable of distinguishing neutrons from gammas, as well as offering a fast response time typically has better capability for detecting the distinctive time-correlated events indicative of the presence of fissioning nuclei.

The ability to detect gamma rays and/or neutrons is a vital tool for many areas of research. Gamma-ray/neutron detectors allow scientists to study celestial phenomena and diagnose medical diseases, and they have been used to determine the yield in an underground nuclear test. Today, these detectors are important tools for homeland security, helping the nation confront new security challenges. The nuclear non-proliferation mission requires detectors capable of identifying diversion of or smuggling of nuclear materials. Government agencies need detectors for scenarios in which a terrorist might use radioactive materials to fashion a destructive device targeted against civilians, structures, or national events. To better detect and prevent nuclear incidents, the Department of Energy (DOE) and the Department of Homeland Security (DHS) are finding projects to develop a suite of detection systems that can search for radioactive sources in different environments.

One particularly useful type of radiation detection, pulse shape discrimination (PSD), which is exhibited by some organic scintillators, involves subtle physical phenomena which give rise to the delayed luminescence characteristic of neutrons, providing a means of distinguishing neutrons from the preponderance of prompt luminescence arising from background gamma interactions. The mechanism by which this occurs begins with the excitation process which produces excited singlet (S1) and excited triplet (T1) states nonradiatively relaxes to the configuration, as shown in FIG. 1. In FIG. 1, the basic physical processes leading to the delayed fluorescence characteristic of neutron excitation of organics with phenyl groups is shown.

Since the triplet is known to be mobile in some compounds, the energy migrates until the collision of two triplets collide and experience an Auger upconversion process, shown as Equation 1:

$$T_1 + T_1 S_0 + S_1 \quad \text{Equation 1}$$

In Equation 1, T1 is a triplet, $S_0$ is the ground state, and $S_1$ is a first excited state. Finally, the delayed singlet emission occurs with a decay rate characteristic of the migration rate and concentration of the triplet population, which is represented as Equation 2:

$$S_1 \rightarrow S_0 + hv \quad \text{Equation 2}$$

In Equation 2, hv is fluorescence, while $S_0$ is the ground state and $S_a$ is a first excited state. The enhanced level of delayed emission for neutrons arises from the short range of the energetic protons produced from neutron collisions (thereby yielding a high concentration of triplets), compared to the longer range of the electrons from the gamma interactions. The resulting higher concentration of triplets from neutrons, compared to gamma interactions, leads to the functionality of PSD. The observation of PSD is believed to be in part related to the benzene ring structure, allowing for the migration of triplet energy.

FIG. 2A shows a typical plot of logarithmic population versus linear time (ns) for stilbene. Population is the singlet excited state population, which is proportional to the output of light from a test crystal under examination, in this case a stilbene crystal, after the crystal it is excited by high energy radiation. As can be seen from the plot, some light is produced by the crystal almost immediately, referred to as prompt luminescence, and other light is produced from the crystal over a period of time, referred to as delayed luminescence. Generally, the plot for each type of radiation will have a steep component 202 and a tail component 204, where the differentiation point 206 between the two is defined in the region where the slope of the line changes dramatically. In this example, the steep component 202, tail component 204, and differentiation point 206 for the Neutron curve is labeled. Note that the steep component, tail component, and differentiation point for the Gamma curve is different for stilbene, and other compounds which possess good PSD properties. Compounds which do not possess good PSD properties will generally not have substantial differences in the curves plotted for Gamma and Neutron radiation. The upper line in the plot shown in FIG. 2A is a Neutron-induced scintillation pulse shape, while the lower line is a Gamma-induced scintillation pulse shape. As can be seen, stilbene is able to differentiate between the Neutron and Gamma pulse shapes, and produces noticeably different luminescence decay lineshapes for each radiation type. However, not every compound has this ability to separate between Gamma and Neutron pulse shapes, and therefore compounds which do are very useful for PSD, as Gamma and Neutron luminescence decay plots have different pulse shapes for these compounds.

Once the population versus time plot has been determined for each test crystal under examination, if it appears that there is PSD for the crystal type, the area ($Q_S$) under the tail component of the curve for each type of radiation is calculated, along with the area ($Q_F$) under the entire line for each type of radiation. By dividing the total area ($Q_F$) into the tail area ($Q_S$), a scatter plot of the ratio of charge versus the pulse height can be produced, as shown in FIG. 2B for stilbene. FIG. 2B shows a plot of the ratio of charge ($Q_S/Q_F$) versus the pulse height, which correlates to an output of a light detector, such as a photomultiplier tube. The x-axis represents the pulse height, which is proportional to the energy of the event. Gamma events correspond to light produced by Compton electrons generated in the detector material. Neutron events correspond to proton recoils in the detector material; lower energy proton recoil events correspond to "glancing angle" interactions between the neutron and proton in the detector material, while a high energy "knock-on" interaction between a neutron and a proton will produce a higher energy event.

Referring to FIG. 2B, at hv equal to about 1600V, conventional scintillators utilizing stilbene exhibit a neutron-to-gamma (n°/γ) separation S of about 0.132. The greater the separation S of neutron-to-gamma, the better PSD performance can be expected.

It is with these scatter plots that good PSD separation can be determined, which is defined as PSD separation, S, which is the gap between the mean ratio of charge $(Q_S/Q_F)$ for Gamma and the mean ratio of charge $(Q_S/Q_F)$ for Neutron taken over an extended period of time. The higher this separation, S, is, the better the compound is at PSD separation.

It is generally accepted in the prior art that stilbene offers good PSD. However, stilbene, generally grown from melt, is difficult to obtain. Therefore, a number of other organic molecules have been examined. Unfortunately, most research in this area has concluded that many known liquid and solid materials, including many compounds having benzene rings, do not possess PSD properties comparable to single-crystal stilbene. Despite the difficulty in identifying compounds with suitable PSD properties, the inventors previously succeeded in demonstrating several exemplary compounds with suitable PSD properties and capable of being grown from solution, including 1-1-4-4-tetraphenyl-1-3-butadiene; 2-fluorobiphenyl-4-carboxylic acid; 4-biphenylcarboxylic acid; 9-10-diphenylanthracene; 9-phenylanthracene; 1-3-5-triphenylbenzene; m-terphenyl; bis-MSB; p-terphenyl; diphenylacetylene; 2-5-diphenyoxazole; 4-benzylbiphenyl; biphenyl; 4-methoxybiphenyl; n-phenylanthranilic acid; and 1-4-diphenyl-1-3-butadiene.

Moreover, crystals such as stilbene, generally grown from melt, are difficult to obtain. Therefore, organic liquid scintillator cocktails comprised of an aromatic solvent, such as toluene, a primary and a secondary fluor, have been developed and are commercially available, however, liquid scintillators do not exhibit PSD properties comparable to single-crystal stilbene, and are also hazardous to field, because these compounds typically include flammable, toxic, and otherwise hazardous materials that limit application to sensitive environments such as aviation, military applications, medical applications, and etc. Moreover, the above crystals, especially when grown from solution, tend to be relatively fragile, making safe and efficient transport difficult.

The patent application referenced above and incorporated by reference described organic materials comparable to or better than stilbene in relation to PSD properties for neutron radiation detection, and in a form that is easier to fabricate into large monoliths which are durable, and which do not introduce hazardous material into the radiation detection process.

However, the foregoing application, while describing plastic scintillators with pulse shape discrimination (PSD) that allowed for the efficient discrimination of fast neutrons from gamma radiation background, did not specifically disclose simultaneous detection of thermal and fast neutrons discriminated from each other and from the background gamma radiation. In real detection conditions, a fraction of neutrons interacting with hydrogenated materials can lose their energy converting into low-energy (thermal) neutrons. Detection of both types of neutrons in previous solutions required simultaneous use of two different types of scintillators. Particularly, capture nuclei-loaded glass and plastic scintillators not capable of PSD were used for thermal neutron detection, while detection of fast neutrons was made mainly using liquid scintillators with PSD. Even this multiple-scintillator approach is insufficient to satisfy demand, as the present techniques for detection of thermal neutrons are based on $^3$He detectors, which have a well-known problem of sharply decreasing availability due to the diminishing supply of $^3$He obtained as a side product of tritium production.

Moreover, for many decades, the most commonly used PSD materials have been liquid scintillators and single crystal stilbene, which enabled efficient discrimination between fast neutron and gamma radiation, due to the high content of hydrogen in their composition (FIG. 12B). However, the detrimental attributions of liquid scintillators, such as significant thermal expansion, moderate freezing point, toxicity, and flammability, produce an environmental hazard and serious handling problems in field conditions, while low availability and high cost of single crystals limits the widespread use of stilbene in neutron detectors.

SUMMARY

A scintillator material according to one embodiment includes a polymer matrix; a primary dye in the polymer matrix, the primary dye being a fluorescent dye, the primary dye being present in an amount of 3 wt % or more; and at least one component in the polymer matrix, the component being selected from a group consisting of B, Li, Gd, a B-containing compound, a Li-containing compound and a Gd-containing compound, wherein the scintillator material exhibits an optical response signature for thermal neutrons that is different than an optical response signature for fast neutrons and gamma rays.

A method for fabricating the scintillator material in one embodiment includes creating a solid structure comprising the polymer matrix having the primary dye and the component therein.

A system according to one embodiment includes a scintillator material as disclosed herein and a photodetector for detecting the response of the material to fast neutron, thermal neutron and gamma ray irradiation.

A method for fabricating a scintillator material according to another embodiment includes placing a precursor mixture in a heating vessel; and heating the precursor mixture until a polymerization process is complete, wherein the precursor mixture comprises: a monomer present in an amount ranging from about 60 wt % to about 95 wt %; a primary fluor present in an amount ranging from about 3 wt % to about 40 wt %; an initiator; and at least one component selected from a group consisting of B, Li, Gd, a B-containing compound, a Li-containing compound and a Gd-containing compound Other aspects and embodiments of the present invention will become apparent from the following detailed description, which, when taken in conjunction with the drawings, illustrate by way of example the principles of the invention.

DETAILED DESCRIPTION

Figure 1:
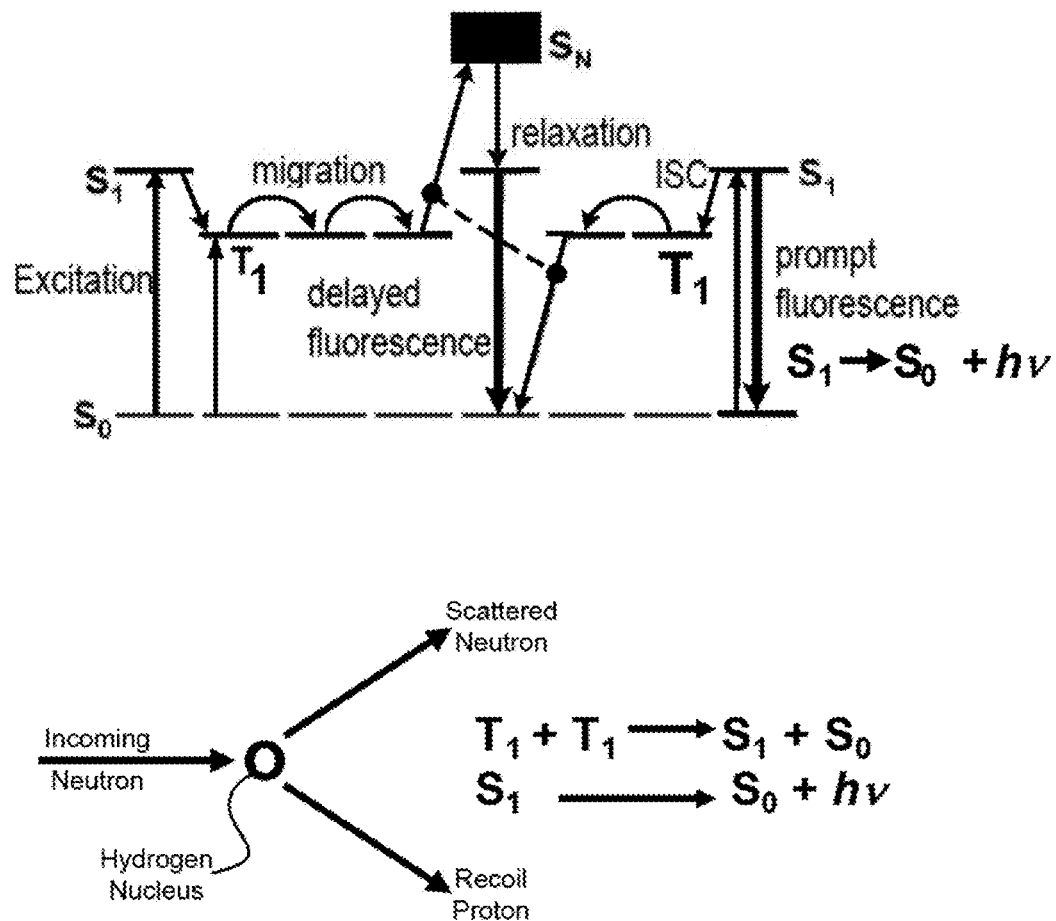
FIG. 1 shows a mechanism for delayed photoluminescence according to the prior art.
Figure 2A:
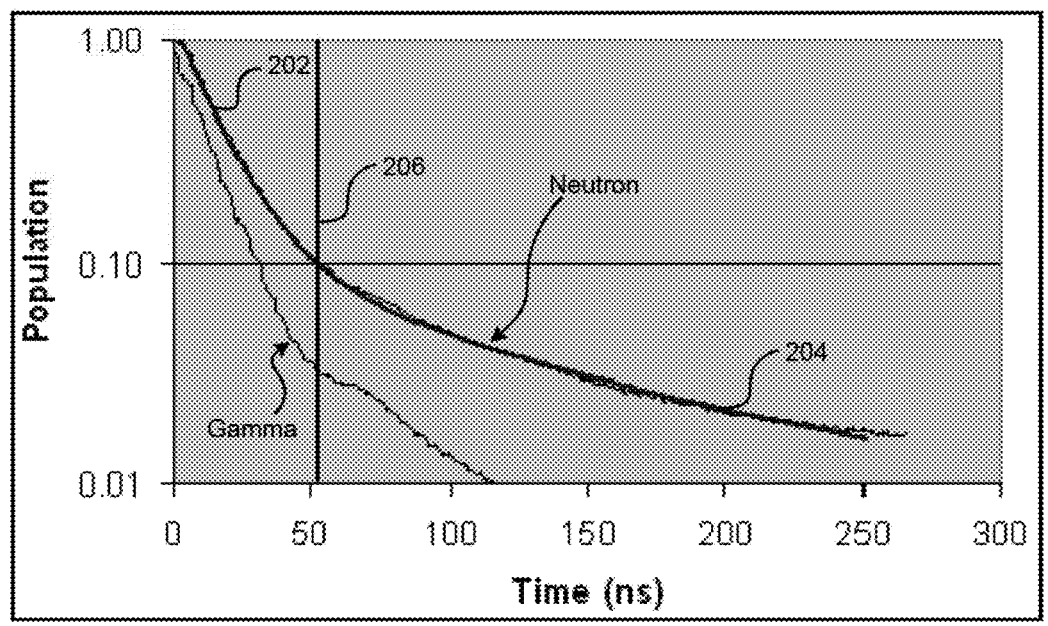
FIG. 2A shows a plot of Population versus Time for stilbene according to the prior art.
Figure 2B:
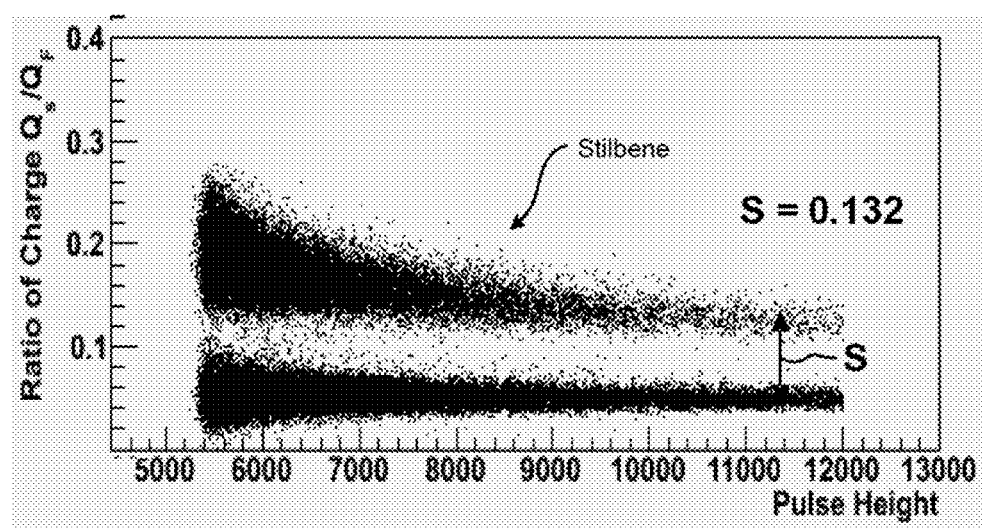
FIG. 2B shows a plot illustrating PSD separation of stilbene according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. The term "about" as used herein refers to ±10% of the denoted value, unless otherwise noted herein.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Unless otherwise noted herein, all percentage values are to be understood as percentage by weight (wt %). Moreover, all percentages by weight are to be understood as disclosed in an amount relative to the bulk weight of an organic plastic scintillator material, in various approaches.

The following description describes several embodiments relating to the use of the fabrication of polymer scintillator materials with distinctively different scintillation pulse shapes resulting from neutron and gamma excitation, respectively.

Moreover, various embodiments of the present invention describe the fabrication of polymer scintillator materials capable of simultaneous detection of thermal neutrons and fast neutrons discriminated from the gamma radiation background.

Neutron radiation detectors can play a central role in detecting radioactive materials and illicit nuclear weapons, since neutrons are a strong indicator for the presence of fissile materials. Accurate detection of neutrons is required in many areas; examples are nuclear nonproliferation, international safeguards, national security, scientific research, etc. In particular, for nuclear nonproliferation, fast and robust methods for the identification of special nuclear materials (SNM) are needed. According to their energy, neutrons are typically divided in two major groups: thermal (low-energy) neutrons and fast (high-energy) neutrons. Detection of both types requires the separation of the neutron signatures from the always-present strong gamma radiation background. In common radiation detection practice, identification of both thermal and fast neutrons requires simultaneous use of two different types of detectors.

Traditionally, gamma excitation in the conventional organic plastic scintillator materials using conventional fluor concentrations in the range of about 0.1-5 wt % fluor have exhibited low excitation density, and weak delayed luminescence. Thus, the ability to distinguish high-energy neutron radiation from gamma radiation has previously been achievable only with liquid scintillators, which are difficult to field, and organic single crystals, which can be fragile and difficult to produce in very large volumes.

Accordingly, the inventive approaches detailed in the present disclosures have not been demonstrated in the past, presumably since very few fluors are soluble at >5 wt % in a polymer matrix. Indeed, the traditional polymer scintillator materials have been limited to including fluors in concentrations which demonstrably lack PSD characteristics, discouragingly suggesting that organic plastic polymer materials would be unsuitable for use as a scintillator material capable of exhibiting PSD characteristics.

However, the inventors of the presently disclosed scintillator have surprisingly discovered that in some embodiments, loading an organic plastic polymer material with high concentrations of fluors, ($\geq 10$ wt %) results in sufficient migration of triplet excitation within the material that the higher excitation density produced by neutron-induced proton recoil results in delayed singlet luminescence from triplet-triplet annihilation. Without wishing to be bound to any particular theory, it is speculated that loading an organic plastic scintillator material with $\geq 10$ wt % of a primary fluor and $\leq 1$ wt % of a secondary fluor with better spectral match to standard photomultipliers may produce an even more effective pulse shape discrimination material. Thus, the use of plastic scintillator material for this application enables passive detection of high-energy neutron radiation as distinguishable from gamma radiation, as well as active interrogation methods, according to various approaches.

In particular, recent studies conducted with organic crystals showed that the main reason for the absence of PSD in mixed systems results from the excitation traps formed by a lower-band-gap fluorescent impurity (fluor) present in the host material (solvent) at low concentration. Moreover, increasing the concentration of the fluor can provide conditions suitable for formation of a network for excitation energy migration and triplet annihilation, and may lead to the appearance of PSD comparable to that typical for pure single crystals of the fluor, in various approaches.

The present disclosure introduces the results of studies conducted with mixed liquid and plastic scintillating systems. Analysis of the results shows that explanations of the conditions leading to the formation of PSD in crystals and liquids can be similarly applied to the mixed plastic systems. The properties of the exemplary plastics scintillators fabricated with efficient neutron/gamma discrimination are discussed in comparison with commercially available liquid and single crystal organic scintillators.

In one general embodiment, a scintillator material includes a polymer matrix; and a primary dye in the polymer matrix, the primary dye being a fluorescent dye, the primary dye being present in an amount of 3 wt % or more; wherein the scintillator material exhibits an optical response signature for neutrons that is different than an optical response signature for gamma rays.

In another general embodiment, a scintillator material includes a polymer matrix; and a primary dye in the polymer matrix, the primary dye being a fluorescent dye, the primary dye being present in an amount greater than 10 wt %.

General Scintillator-Based Radiation Detector System

Figure 3:
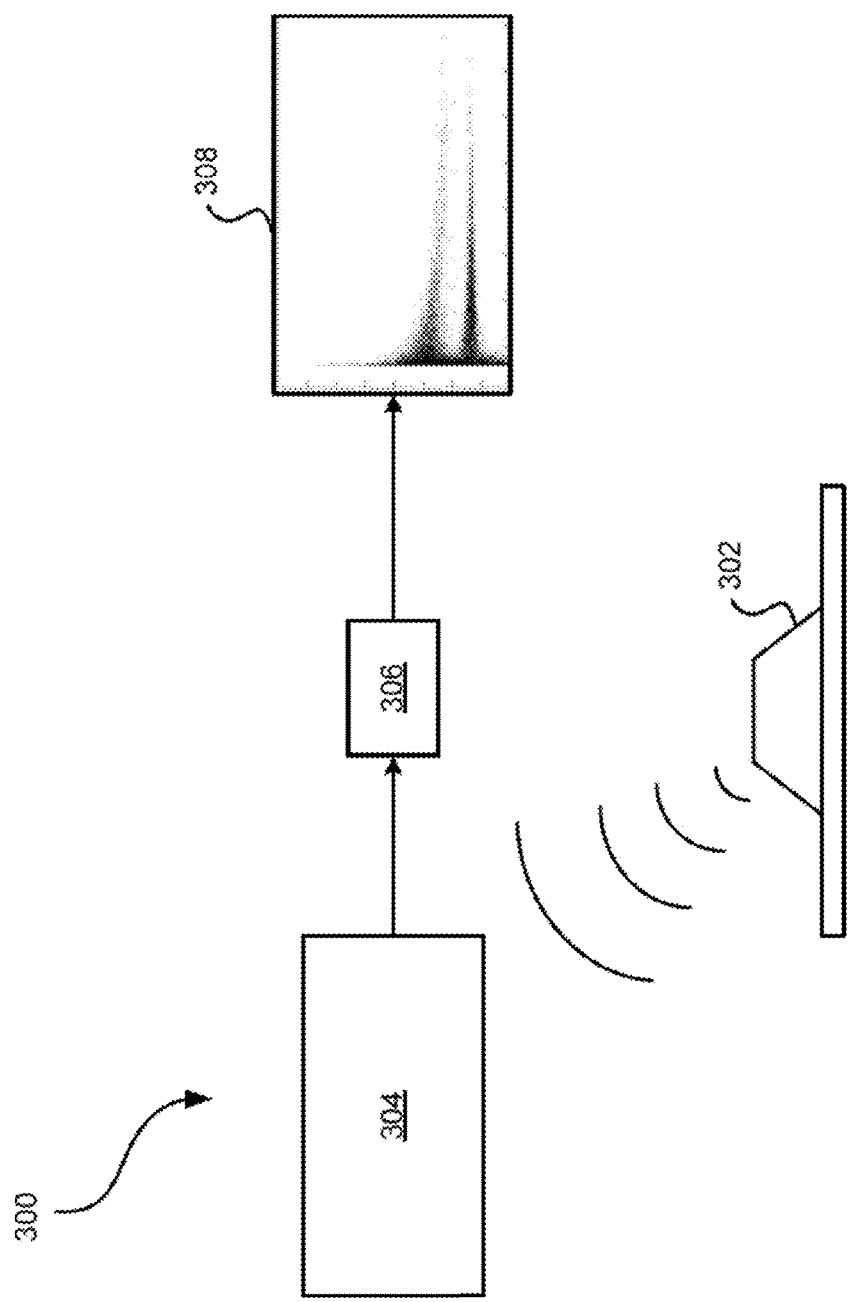
FIG. 3 shows a simplified schematic layout of a system that may use crystals described herein, according to one embodiment.

FIG. 3 depicts a simplified spectroscopy system according to one embodiment. The system 300 comprises a scintillator material 302, such as of a type described herein, and which is referred to herein interchangeably as a scintillator. The system 300 also includes a photodetector 304, such as a photomultiplier tube or other device known in the art, which can detect light emitted from the scintillator 302, and detect the response of the material to at least one of neutron and gamma ray irradiation.

The scintillator 302 produces light pulses upon occurrence of an event, such as a neutron, a gamma ray, or other radiation engaging the scintillator 302. As the gamma ray, for example, traverses the scintillator 302, photons are released, appearing as light pulses emitted from the scintillator 302. The light pulses are detected by the photodetector 304 and transduced into electrical signals that correspond to the pulses. The type of radiation can then be determined by analyzing the integral of the light pulses and thereby identifying the gamma ray energy absorbed by the scintillator.

In some embodiments, the system 300 may be, further comprise, or be coupleable/coupled to, a processing device 306 for processing pulse traces output by the photodetector 304. In other embodiments, the system 300 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 308 in any form, such as in a histogram or derivative thereof.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software miming on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

Polymer

The inventive organic plastic scintillator system as encompassed by the present disclosures may include any suitable polymer as the plastic component. Particularly suitable are rigid, durable, transparent plastics, possessing an aromatic struction having pi-conjugated rings, and capable of supporting high concentrations of primary, secondary, tertiary, and etc. fluors, e.g. with a total concentration in the range of about 3-75 wt % fluor, according to some embodiments. In a preferred embodiment, the organic plastic component may include a polymer comprising polyvinyltoluene (PVT). In other embodiments, similar polymers may be utilized, such as polystyrene (PS), polyvinyl xylene (PVX), polymethyl, 2,4-dimethyl, 2,4,5-trimethyl styrenes, polyvinyl diphenyl, polyvinyl naphthalene, polyvinyl tetrahydronaphthalene polymers, other complex aromatic polymers, and certain non-aromatic polymers capable of solubilizing high fluor concentrations, etc. as would be understood by one having ordinary skill in the art upon reading the present descriptions.

As described herein, suitable polymers may be preferably at least 95% light transmissive in a wavelength of interest, e.g. a wavelength emitted by one or more fluors present in the organic plastic scintillator system, in some embodiments.

Moreover, the polymer may be provided as a liquid polymer matrix, a non-liquid polymer matrix, a dry powder, etc. as would be understood by one having ordinary skill in the art upon reading the present descriptions. Moreover, in various approaches the polymer matrix may include aromatic functional groups, such as phenyl groups, among others.

Fluors

Primary fluors suitable for use in the presently disclosed scintillator system include any fluor as known in the art and capable of exhibiting characteristics of pulse-shape discrimination as described herein. Moreover, the primary fluor of the exemplary organic plastic scintillator system is present in high concentration, e.g. about 3-5 wt % or more, in one embodiment. In preferred embodiments, the primary dye may be present in an amount of 20 wt % or more, and in particularly preferred embodiments, the primary dye may be present in an amount ranging from about 20 wt % to about 75 wt % or an amount ranging from about 30 wt % to about 75 wt %. As discussed herein, the concentrations of fluor are described relative to a weight of the bulk scintillator material, in various embodiments.

In one particular embodiment, a scintillator system may include a polymer matrix and a primary fluor disposed in the polymer matrix. Moreover, the primary fluor may be a fluorescent dye present in an amount of 3-5 wt % or more, and such fluorescent dye results in the scintillator material exhibiting an optical response signature for neutrons that is different than an optical response signature for gamma rays.

Accordingly, where primary fluors are present in high concentration in the exemplary organic plastic scintillator system, a corollary principle is that the solubility of the fluor in the polymer is preferably high. In one embodiment, for example, the polymer may be characterized by having a solubility of about 3-5 wt % or more with respect to a particular fluor.

Moreover, in some approaches the primary fluor may include multiple dyes. In further approaches the primary fluor may include multiple fluorescent dyes.

Figure 14:
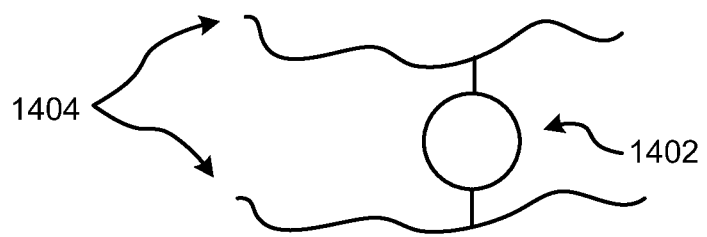
FIG. 14 depicts a simplified representation of a primary fluor crosslinked to a polymer matrix, according to one embodiment.

Moreover still, a primary fluor may be incorporated into the polymer according to any suitable mechanism. For example, in one embodiment the primary fluor may be suspended in the polymer matrix and dispersed to an approximately uniform distribution. In other embodiments, the primary fluor may be crosslinked to the polymer matrix. FIG. 14 illustrates a simplified representation of one such embodiment in which the primary fluor 1402 may be crosslinked to the polymer matrix 1404. In still other embodiments, the primary fluor may be copolymerized with the polymer matrix, and/or with another component of the polymer matrix, etc. as would be understood by one having ordinary skill in the art upon reading the present descriptions. Of course, other arrangements of fluor and polymer matrix may be utilized without departing from the scope of the present descriptions.

The secondary fluor of the exemplary plastic scintillator system is characterized by wavelength-shifting qualities, such that in the presence of another fluor, particularly a primary fluor present in high concentration in a plastic scintillator system, PSD characteristics of the plastic scintillator system with the primary fluor and the secondary fluor in combination are superior to PSD characteristics of a plastic scintillator system having the same primary fluor exclusively present in high concentration, according to one embodiment.

Suitable secondary fluors include any fluor characterized by wavelength-shifting as described herein, and several exemplary embodiments may utilize secondary fluors such as diphenyl anthracene (DPA), tetraphenyl butadiene (TPB) 1,1,4,4-tetraphenyl-1,3-butadiene, 1,4-Bis(5-phenyl-2-oxazolyl)benzene (POPOP), p-bis(o-methylstyryl)benzene, 1,4-bis-2-(4-methyl-5-phenyloxazolyl)benzene, 2,2'-p-phenylenebis(5-phenoxazole), diphenylstilbene, 1,3,5-triaryl-2-pyrazolines, 4-(n-butylamino)-2-(4-methoxyphenyl)benzo[b]pyrylium perchlorate, sodium salicylate, 1,4-bis(2-methylstyryl)benzene (Bis-MSB), 7-dimethylamino-4-methyl-2-quinoline, 7-amino-4-methylcoumarin, 4,6-dimethyl-7-ethylamino coumarin, etc. as would be understood by one having ordinary skill in the art upon reading the present descriptions. Particularly preferred secondary fluors include DPA, TPB, POPOP, and Bis-MSB according to one embodiment.

Regarding the concentration of the secondary fluor, as described herein the exemplary organic plastic scintillator system may include secondary fluor in a low concentration in order to maximize the beneficial wavelength-shifting effects on PSD performance. For example, in one embodiment the secondary fluor may be present in an amount of about 2 wt % or less. As described herein, secondary fluors may be present in an amount described relative to a weight of the bulk scintillator material.

Particularly impressive PSD values have surprisingly been obtained with a plastic scintillator embodiment including polyvinyl toluene (PVT) with ~30% 2,5-diphenyl oxazole (PPO) as primary fluor and 0.5% diphenyl anthracene (DPA), as secondary fluor, according to one embodiment. Particularly surprising is the solubility of PPO in the PVT polymer, which allows for excellent PSD characteristics described herein.

One preferred embodiment of a PSD plastic can by formed by combining: 0.1-1% Benzoyl peroxide (initiator), 30% 2,5-diphenyl oxazole (PPO) as primary fluor, 0.2-0.5% diphenyl anthracene (DPA), or tetraphenyl butadiene (TPB) as secondary fluor and balance vinyl toluene. The process of creating the plastic corresponding to this embodiment may include: adding the materials listed above to a container in a glovebox under an $N_2$ atmosphere, such as a wide mouth glass jar in one exemplary embodiment, placing the container in an oven at 80 C, and allowing the jar to sit in the oven undisturbed for four days, after which it is cooled to room temperature in ambient conditions. The resultant polymer is rigid, substantially transparent and offers excellent scintillation properties for pulse shape discrimination.

Scintillator Fabrication

Various embodiments may employ any known scintillator material without departing from the scope of the present disclosure. However, several preferred approaches for fabricating scintillators with suitable PSD characteristics from organic plastic are described below.

In one embodiment, liquid scintillator mixtures were fabricated from anhydrous p-xylene (>99%), 2,5-diphenyloxazole (PPO, 99%), and 9,10-diphenylanthracene (DPA, >98%) in the oxygen-free atmosphere of a nitrogen-filled glovebox. PPO was used as received. DPA was stirred for 0.5 h in warm acetone, collected by filtration, dried, and stored in, nitrogen atmosphere prior to sample preparations. The liquid mixtures of required concentrations were transferred into sealed 50 mm×10 mm cylindrical quartz cuvettes and subsequently used for further measurements.

In another approach, plastic scintillator mixtures were fabricated as follows. Vinyl toluene was filtered through a chromatographic support material to remove inhibitor prior to polymerization. Filtered vinyl toluene and an initiator, e.g. benzoyl peroxide, were sparged with nitrogen for 40 minutes and stored in sealed containers in a glovebox refrigerator at −20 C. To conduct polymerization, required amounts of PPO and DPA were weighed in a glovebox into 20 mL scintillation vials, initiator (10-30 mg) and vinyl toluene were then added to make up the final weight proportions of polymer parts. The vials were tightly sealed, removed from the glovebox, and placed in an oven at 80 C. Two hours later they were shaken to ensure complete mixing, and then held at 80 C for a total of 96 hours. After cooling to room temperature the glass was scored and broken with a mallet to remove the bare scintillator part.

Of course, the above fabrication methodologies are provided only by way of example, and organic plastic scintillator systems comprising polymers other than PVT and/or fluors other than DPA/PPO may be fabricated under similar conditions, but taking account for slight variations in various approaches, e.g. to temperature, incubation time, amount of respective components, etc. as would be understood by a skilled artisan reading the present descriptions.

Figure 10:
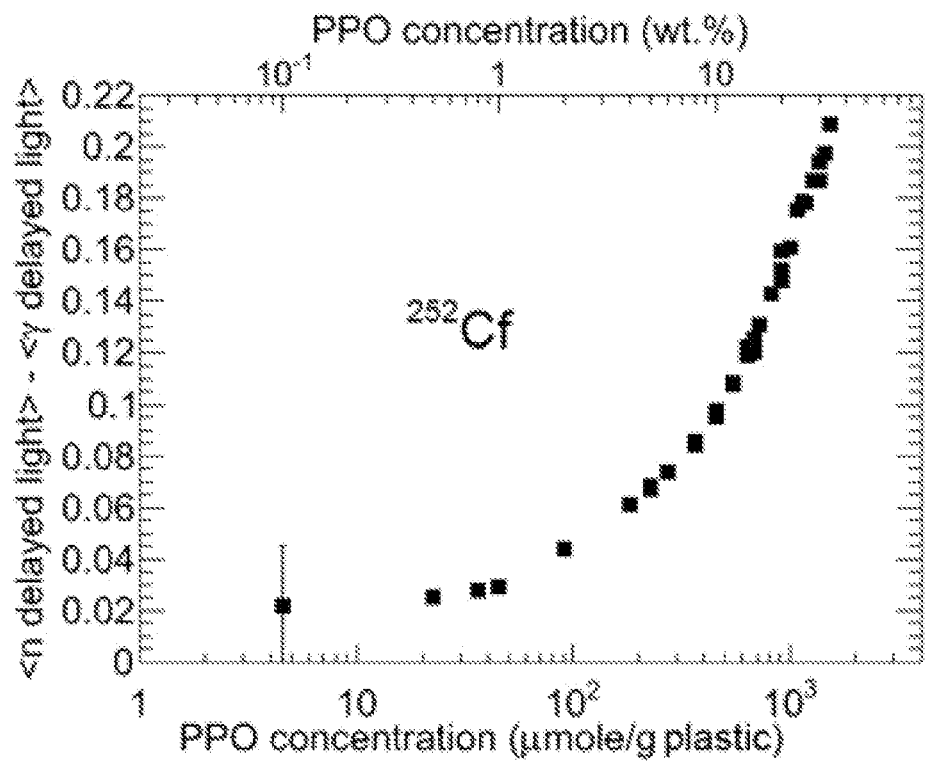
FIG. 10 is a plot depicting general dependence of neutron-gamma separation measured in the whole range of concentrations up to the limit of the PPO solubility.
Figure 11:
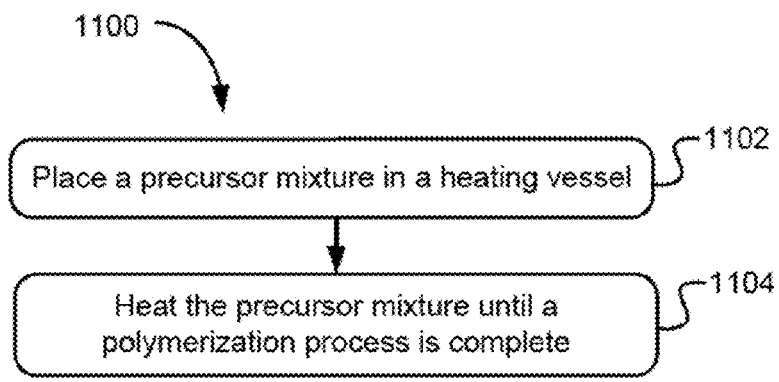
FIG. 11 is a flowchart of a method, according to one embodiment.

Furthermore, the present descriptions also encompass methods for fabricating scintillator materials as described herein, as particularly represented by FIG. 11, in various approaches. FIG. 11 depicts a method 1100. As will be appreciated by the skilled artisan reading the present descriptions, the method 1100 may be performed in any environment, including those depicted in FIGS. 1-10, among others. Regardless of environment, the method 1100 is characterized by operation 1102, where a scintillator precursor mixture is placed in a heating vessel, and subsequently heated until a polymerization process has completed in operation 1104. In one embodiment, the scintillator precursor mixture is a combination of about 60-95 wt % of a monomer, about 5-40 wt % of a primary fluor, and about 0.1 wt % of a free radical initiator. Any monomer capable of polymerizing and solvating the primary fluor in an amount ranging from about 5-40 wt % may be employed in the exemplary fabrication process, according to one embodiment and as would be understood by one having ordinary skill in the art upon reading the present descriptions.

In one particular embodiment, the fabrication process may include combining about seven grams of vinyl toluene, about 2.94 grams of PPO, and about 0.01 grains of benzoyl peroxide in a heating vessel, mixing the combination, and heating the mixture at about 80° C. for approximately 96 hours.

In another embodiment, the fabrication process may include combining about seven grams of vinyl toluene, about 2.94 grams of PPO, about 0.05 grams of DPA, and about 0.01 grams of benzoyl peroxide in a heating vessel, mixing the combination, and heating the mixture at about 80° C. for approximately 96 hours.

Notably, the solid structure may include any of the structures described herein, and the primary fluor may include any fluor as described herein, according to some approaches.

Experimental Results: Photoluminescence

Growth and characterization of mixed single crystals led to an understanding of the mechanisms of excited state migration and interaction, prompting an exploration of compositions of polymer scintillator with sufficient fluor to reach the percolation threshold whereupon triplet excitation is able to migrate and annihilate. Experiments with complex liquid mixtures lead to findings that high loading with fluors helps improve pulse shape discrimination (PSD) in such organic scintillators as well. So far, the polymer scintillators offering PSD exhibit a figure of merit (FOM) for PSD of ~3, compared to >4 for certain single crystal organics, such as stilbene, etc. This performance metric is already sufficient to distinguish neutrons from gammas down to the few hundred keV/gamma equivalent regime, and will be very useful for non-proliferation, homeland security and safeguards applications.

Photoluminescence (PL) spectra were measured under UV excitation using a commercial Spex Fluoromax-2 spectrometer. The scintillation light yield efficiency was evaluated from the position of the Compton edge in the $^{137}$Cs spectra, in which 480 keVee (electron-equivalent energy) was defined by 50% of the Compton edge peak. Neutron detection properties of samples were studied using a $^{252}$Cf source shielded with 5.1 cm of lead, which reduced the gamma rates to the same order of magnitude as neutrons, to irradiate liquid or plastic samples coupled to Hamamatsu R6231-100-SEL photomultiplier tube (PMT). The signals collected at the PMT anode were recorded using a 14-bit high-resolution waveform CompuScope 14200 digitizer with a sampling rate of 200 MS/s, for offline analysis.

Figure 5:
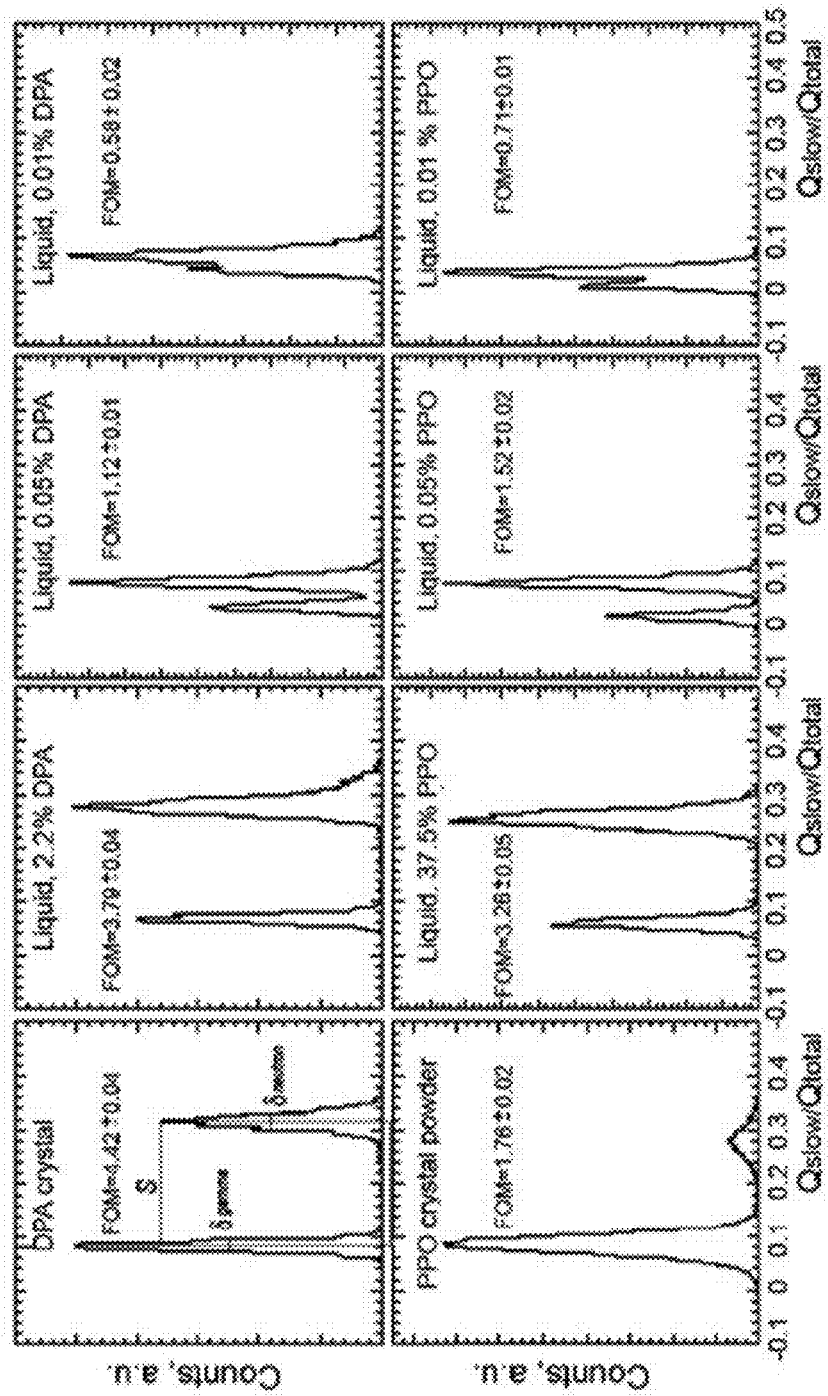
FIG. 5 shows a comparative graphical representation of integrated gamma/neutron separation plots for organic plastic scintillators utilizing different phases and/or concentrations of 2,5-diphenyl oxazole (PPO) and diphenyl anthracene (DPA), according to various embodiments.

The ability of scintillators to discriminate between the neutrons and gamma rays emitted from the $^{252}$Cf source was evaluated using the charge integration method. In particular, waveforms were numerically integrated over two time intervals: $\Delta t_{Total}$ and a subinterval $\Delta t_{Tail}$, corresponding to the total charge ($Q_{Total}$) and the delayed component ($Q_{Tail}$) of the signal, respectively. The value of the ratio of charge $R=Q_{Tail}/Q_{Total}$ for the two time intervals indicated whether the considered event was likely produced by a neutron (high R value) or a gamma ray (small R value). Quantitative evaluation of PSD was made using Figures of Merit (FOM) as represented in Equation 3, where S is the separation between gamma and neutron peaks, and $\delta_{gamma}$ and $\delta_{neutron}$ are the full width at half maximum (FWHM) of the corresponding peaks, as shown in FIG. 5, according to one embodiment.

$$FOM=S/(\delta_{gamma}+\delta_{neutron}) \quad \text{Equation 3}$$

The experimental separation S was calculated as a difference between the mean delayed light fraction, ($Q_{Tail}/Q_{Total}$) for neutrons and gammas taken as a normal distribution in PSD over a specified energy range. In total 40000 events were collected for each scintillator sample, with approximately 20% of the statistics used for FOM calculation in the energy range near the Compton edge.

A reasonable definition for well separated Gaussian distributions of similar population sizes is shown in Equation 4, below, where σ is the standard deviation for each corresponding peak.

$$\sigma > 3(\sigma_{gamma}+\sigma_{neutron}) \quad \text{Equation 4}$$

Noting that where FWHM 2.36, a reference parameter $FOM \geq 3(\sigma_{gamma}+\sigma_{neutron})/2.36(\sigma_{gamma}+\sigma_{neutron})$ was used to define efficient PSD in the tested samples. The experimentally determined efficiency value was ≈1.27

One characteristic of the exemplary scintillator material described herein is that the system exhibits an optical response signature for neutrons that is different than an optical response signature for gamma rays, according to one embodiment. In particular, the neutron optical response signature may be in the range of about 600-800 keV gamma equivalent, according to one embodiment.

Figure 4A:
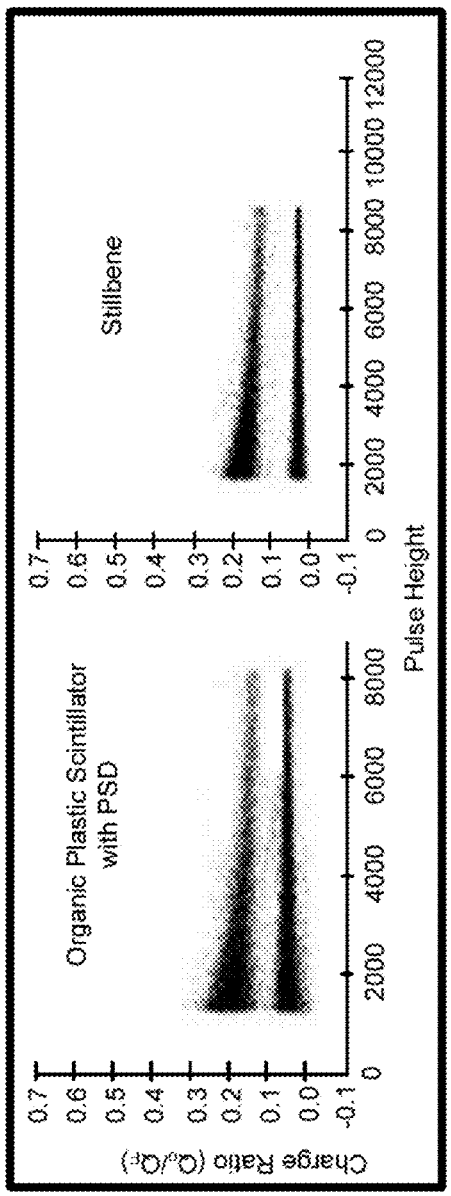
FIG. 4A shows a comparative graphical representation of gamma/neutron separation plotted according to charge ratio versus pulse height for an organic plastic scintillator and stilbene, according to one embodiment.
Figure 4B:
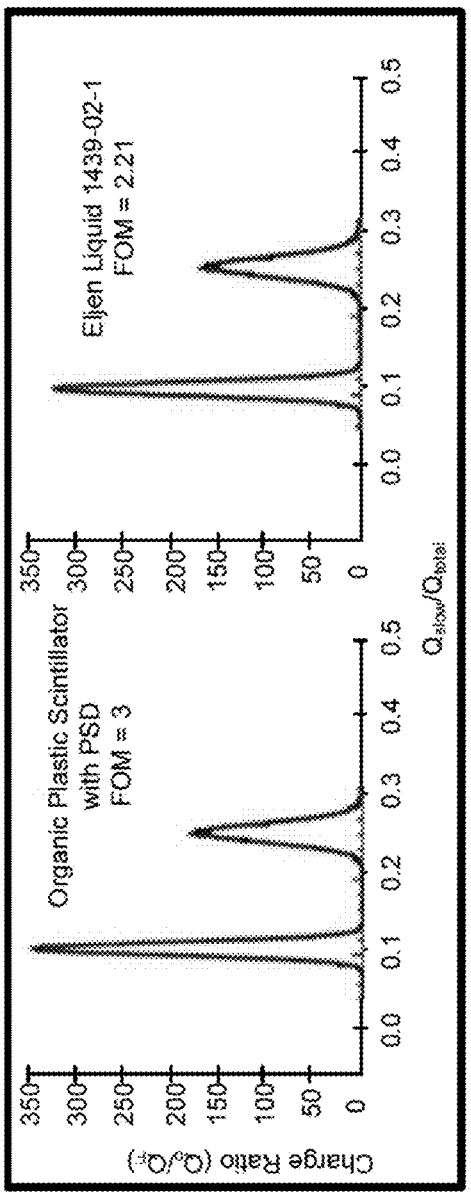
FIG. 4B shows a comparative graphical representation of integrated gamma/neutron separation plotted for an organic plastic scintillator with FOM 3 and an Eljen liquid with FOM 2.21, according to one embodiment.

FIGS. 4A-4B show examples of PSD patterns measured in some organics with phenyl groups according to several embodiments. FIG. 4A shows a comparison of the charge ratio $Q_Q/Q_F$ as exhibited by one embodiment of an organic plastic scintillator as described in the present disclosures, and a scintillator utilizing a stilbene crystal. As can be seen from the figure, the inventors have successfully created organic plastic scintillator embodiments that exhibit similar PSD characteristics as single crystal systems employing stilbene as the scintillating material. Accordingly, it is possible to generate a more rigid and durable, scintillator material from organic plastic while retaining the advantageous neutron and gamma radiation separation characteristics of more expensive and fragile alternatives such as liquid and single crystal scintillators.

FIG. 4B depicts comparative FOM readings taken from an exemplary organic plastic scintillator exhibiting PSD as described herein and according to one embodiment as compared to a FOM reading of a LLNL Eljen liquid scintillator, according to one embodiment. When comparing FOM readings from FIG. 4B, both of which used test samples of approximately the same volume, a clear improvement in the FOM levels is apparent. Particularly, the FIG. 4B illustrates a FOM reading of 3 taken from a LLNL plastic scintillator, according to one embodiment. This FOM reading shows PSD approaching the level of typical liquid and single crystal organic scintillators, thus improving neutron/gamma discrimination properties of both liquid and plastic scintillators in the embodiments shown, among others within the scope of the present descriptions.

The discovery that organic plastic scintillators are suitable alternatives for more dangerous, expensive, burdensome, etc. systems such as single crystal scintillators and liquid scintillators led the inventors to experiment with a variety of polymer and fluor candidates. With reference to FIG. 5, several exemplary embodiments of organic plastic scintillators as described herein are depicted according to FOM performance of various embodiments including different fluor(s) in a range of concentrations, in some approaches.

As shown in FIG. 5, the top row of graphs represent measurements that were taken from liquid scintillator systems comprising diphenyl anthracene (DPA) as a fluor. Conversely, the bottom row of graphs represent measurements that were taken from scintillator systems comprising 2,5-diphenyl oxazole (PPO) as a fluor. Each fluor exhibits characteristic FOM as a crystal, shown in FIG. 5 as FOM=4.42 for DPA crystal and FOM=1.76 for PPO crystal powder, respectively.

Moreover, as can be seen from FIG. 5, fluor FOM generally decreases as a function of concentration in solution. For example, a solution of about 2.2% DPA yields a FOM value of about 3.79, according to one embodiment, while a solution of about 0.05% DPA exhibits a FOM value of about 1.12, according to another embodiment, and a solution of about 0.01% DPA exhibits a FOM value of about 0.58, according to yet another embodiment.

Similarly, liquid solutions of PPO yield FOM values that decrease as a function of PPO concentration. For example, as shown in FIG. 5 a solution of about 37.5% PPO yields a FOM value of approximately 3.26, while a solution of about 0.05% PPO yields a FOM value of about 1.52, and a solution of about 0.01% PPO yields a FOM value of about 0.71, according to several embodiments.

Figure 6:
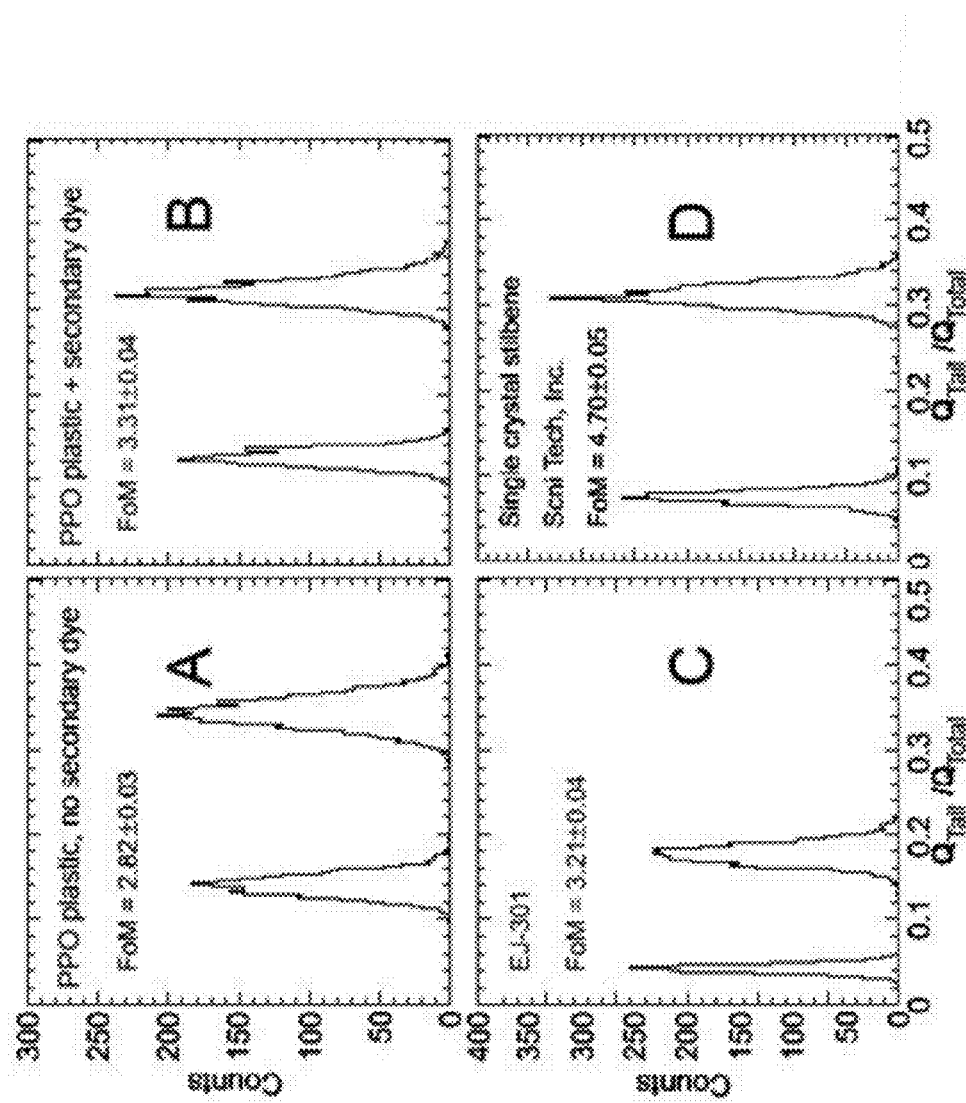
FIG. 6 shows a plot comparing integrated gamma/neutron separation for scintillator systems including a plastic scintillator and a primary fluor, a plastic scintillator, a primary fluor and a secondary fluor, an Eljen liquid, and a stilbene crystal, according to various embodiments.

Referring now to FIG. 6, a plot comparing integrated gamma/neutron separation for scintillator systems including a plastic scintillator and a primary fluor, a plastic scintillator, a primary fluor and a secondary fluor, an Eljen liquid, and a stilbene crystal is shown, according to various embodiments.

Panel A of FIG. 6 depicts PSD characteristics of an organic plastic scintillator system including PPO as a primary fluor, and no secondary fluor. As can be seen from the figure, this system exhibits a FOM value of about 2.82, according to one embodiment. Comparatively, panel B shows a similar system comprising an organic plastic scintillator with a primary fluor including PPO and further including a secondary fluor. As can be seen from FIG. 6, this system exhibits superior FOM values compared to the similar system lacking a secondary fluor, and in one embodiment exhibits a FOM value of approximately 3.31.

Further still, Panels C and D of FIG. 6 provide reference points from which to compare the performance of the exemplary organic plastic scintillator systems as described herein against the performance of liquid and single crystal stilbene scintillator systems, respectively. As can be seen from the figure, the liquid scintillator system shown in Panel C exhibits a FOM value of approximately 3.21, while the single crystal stilbene scintillator system shown in Panel D exhibits a FOM value of about 4.70, according to some embodiments. Notably, the exemplary organic plastic scintillator system including PPO as a primary fluor and a secondary fluor outperforms the liquid scintillator system in terms of FOM value, and approximates the performance of the industry-standard single crystal stilbene system. Accordingly, high quality PSD characteristics may be imparted to modern scintillator systems without incorporating expensive, fragile, and/or hazardous materials of the conventional scintillator system.

Figures 7A, 7B:
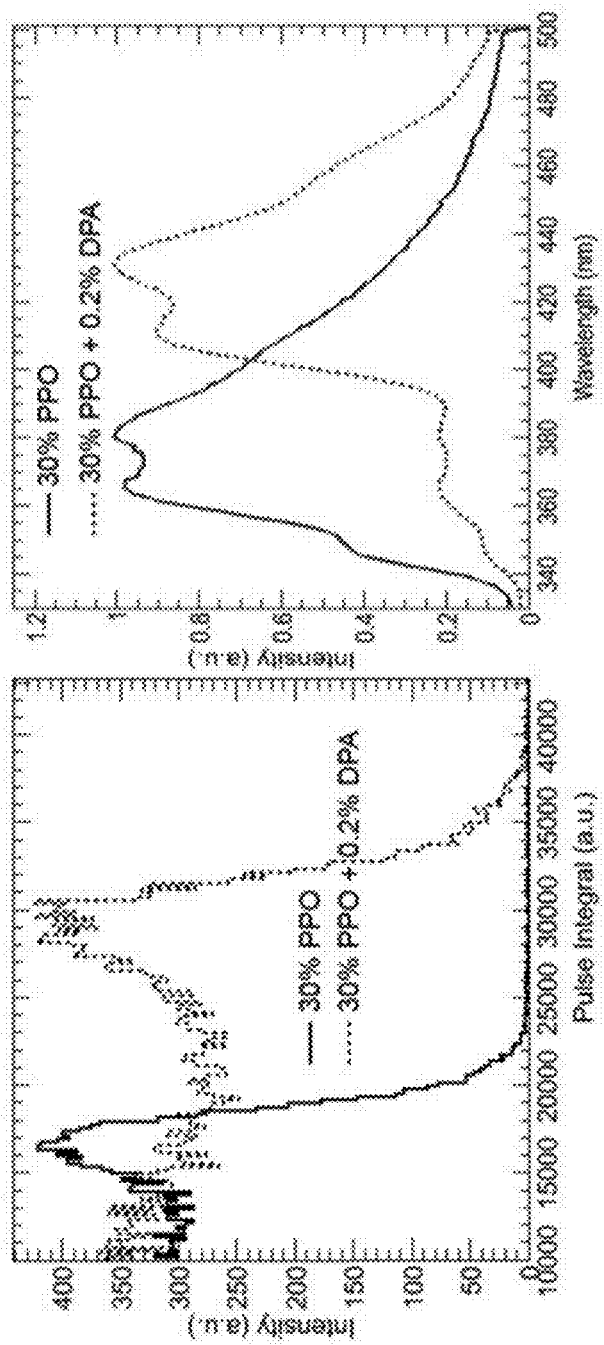
FIG. 7A shows a plot of signal intensity versus pulse integral for an organic plastic scintillator employing 30% 2,5-diphenyl oxazole (PPO) as a primary fluor versus an organic plastic scintillator employing 30% 2,5-diphenyl oxazole (PPO) as a primary fluor and 0.2% diphenyl anthracene (DPA) as a secondary fluor.
FIG. 7B shows a plot of photoluminescence intensity versus wavelength for an organic plastic scintillator employing 30% 2,5-diphenyl oxazole (PPO) as a primary fluor versus a scintillator employing 30% 2,5-diphenyl oxazole (PPO) as a primary fluor and 0.2% diphenyl anthracene (DPA) as a secondary fluor.

Referring now to FIGS. 7A and 7B, the comparative effects of including multiple fluors in a scintillator crystal are shown, according to one embodiment.

As may be seen particularly from FIG. 7A, a plastic scintillator having, e.g. 30% w/v PPO as a primary fluor is capable of neutron detection. Moreover, neutron detection may be improved by incorporating a low concentration of a secondary fluor, where the secondary fluor is characterized by emitting photons of lower energy (longer wavelength) than photons emitted by the primary fluor, according to one embodiment.

As shown in FIG. 7B, embodiments of plastic scintillators containing only the primary fluor PPO exhibit an emission spectrum with a major peak near 360 nm. By contrast, embodiments of plastic scintillators containing primary and secondary fluor, such as DPA, exhibit emission spectra characterized by a peak shift to a longer wavelength (lower energy). Moreover, including a secondary fluor also results in greater luminescence than in systems including only a primary fluor, according to one embodiment.

Moreover, including high concentrations of primary fluor improves PSD behavior, but at higher concentrations disadvantageous self-absorption of emitted photons traps the light and prevents its emission from the scintillator. In one approach, including a secondary fluor with a lower emission wavelength than the primary fluor shifts the energy of the emitted photon and preventing unfavorable absorption thereof by the primary fluor molecules. Preferably, secondary fluor may be included in such low concentration that self-absorption is negligible, thereby circumventing the disadvantages inherent to high concentrations of a single fluor, according to one embodiment.

Figure 8:
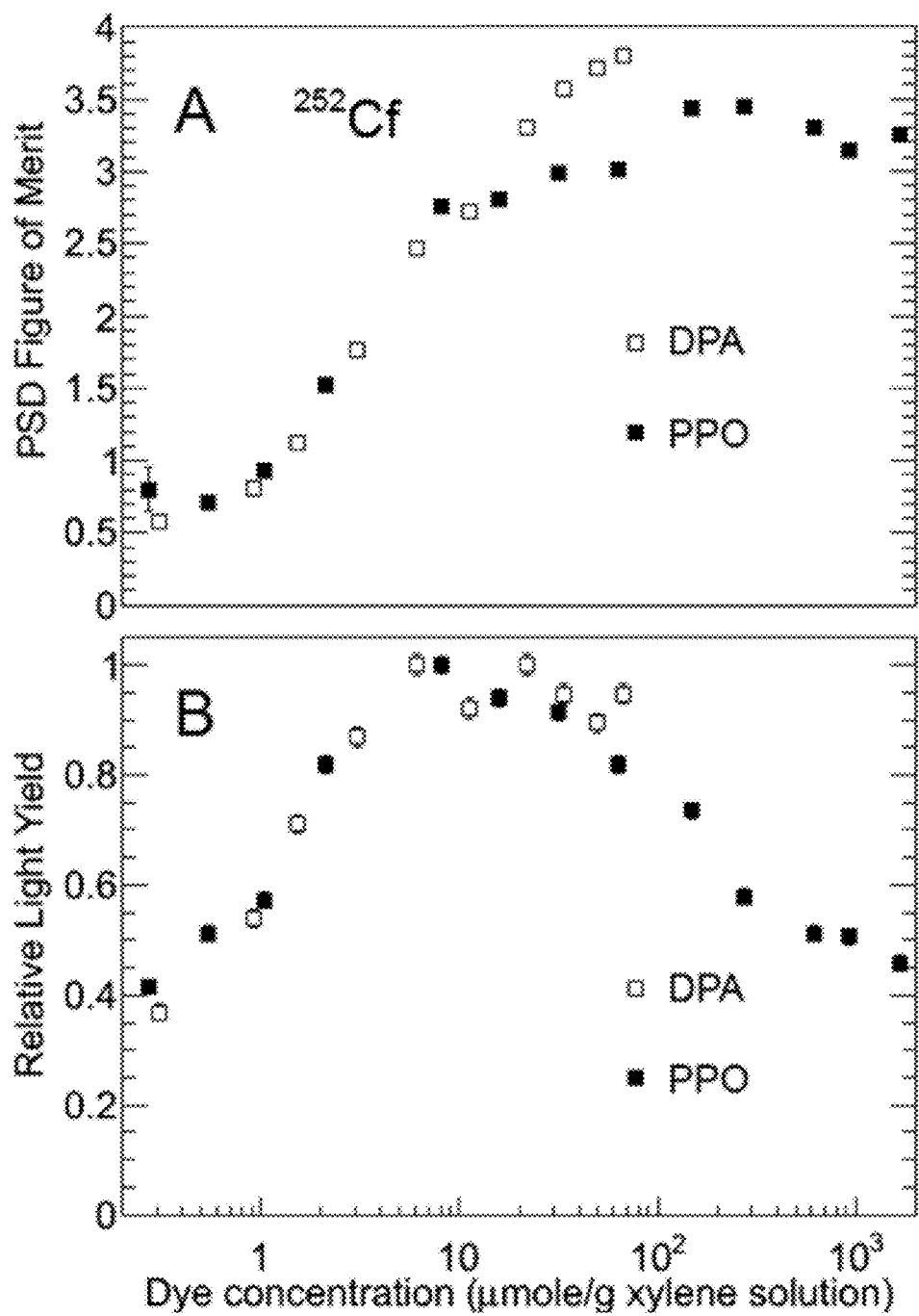
FIG. 8 shows a plot of PSD characteristics versus fluor concentration for PPO and DPA solubilized in xylene solution, according to one embodiment.

Referring now to FIG. 8, the dependence of PSD on fluor concentration is shown as measured in one embodiment including PPO as a primary fluor and DPA as a secondary fluor through the entire range of respective solubility in xylene.

For both types of solutions, there is a region of very low fluor concentrations (<1 μmole/g solution, or ~0.02 wt. %) with negligibly small PSD. Increasing the concentration leads to a gradual enhancement of PSD which, despite the large difference in the solubility, surprisingly exhibits a similar slope for both fluors up to a molecular concentration of about 10 μmole/g solution. It is further interesting to note that the separation of the PSD curves unexpectedly occurs at a concentration corresponding to the maximum light yield for both PPO and DPA (~10 μmole/g), as particularly shown in panel B of FIG. 8, according to one embodiment.

This decrease of the scintillation light efficiency at increasing fluor concentration (concentration quenching) is ascribed to the formation of excimers ($S_0S_1$). Therefore, the separation of the PSD curves may relate to different kinetics of these processes for different types of the molecules. For example, in one embodiment a rise in PSD to efficient values above a concentration threshold as measured in DPA and PPO solutions is similar to that observed in mixed crystal scintillation systems, which exhibit PSD behavior according to the simple model of energy transfer and triplet-triplet annihilation shown in FIG. 1.

Accordingly, at very small concentrations, excited singlet states of the solute molecules still produce scintillation light, while excited triplets behave more like energy traps, since direct fluorescence from the triplets is effectively forbidden.

Meanwhile, at relatively large intermolecular distances and low probability of collisions, e.g. in dilute solutions, fluor molecules cannot interact, thus leading to quenched triplet migration, recombination, and a resulting degradation, or even worse, absence of PSD behavior. At the higher concentrations, increased probability of triplet-triplet collisions leads to the enhancement of the delayed light and a rise of the PSD above a certain concentration threshold corresponding to the establishment of a continuous network of interacting fluor molecules.

Figure 9:
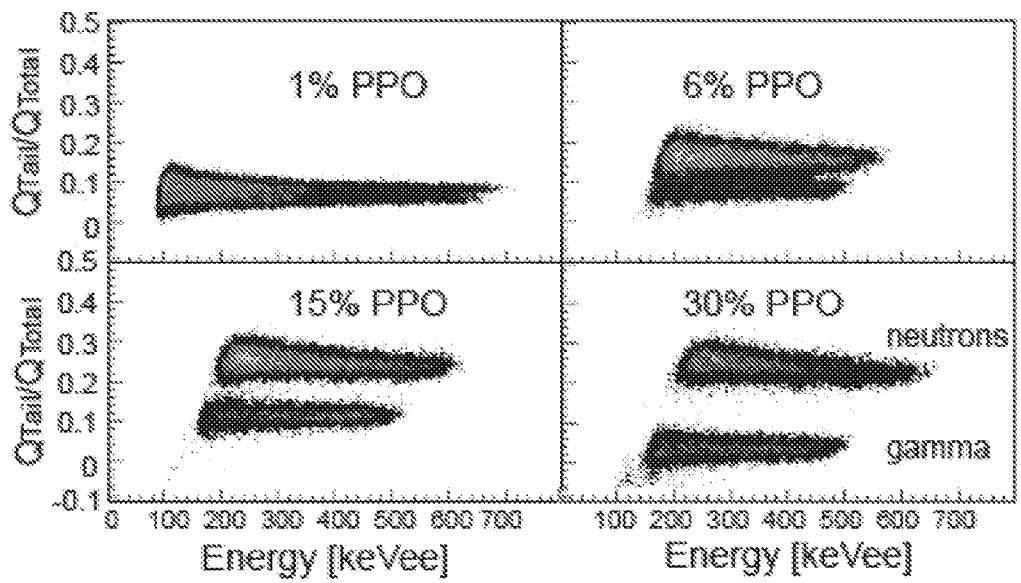
FIG. 9 depicts experimental PSD patterns showing increase of neutron-gamma peak separation at increasing PPO concentration in a polyvinyl toluene (PVT) polymer matrix, according to one embodiment.

Several exemplary organic plastic scintillators with varied fluor concentration were analyzed, and some results of several exemplary embodiments are shown in FIG. 9. As evidenced by FIG. 9, a general trend is observable wherein quality of separation between neutron radiation signals and gamma radiation signals exhibits improved resolution with increasing primary fluor concentration. For example, as shown in FIG. 9 one embodiment of an organic plastic scintillator system including only 1 wt % PPO as a primary fluor exhibits no resolution of neutron and gamma radiation signals, respectively, and therefore is incapable of discriminating between the two as required for suitable PSD performance. At about 6 wt % PPO, neutron radiation and gamma radiation signals begin to resolve, but still insufficiently to achieve desirable PSD characteristics, according to some embodiments.

In some approaches, true separation between neutron radiation and gamma radiation signals can be seen at primary fluor concentrations of about 10 wt %, and improve with increased primary fluor concentration to about 15 wt %, as shown in FIG. 9, according to one embodiment. Moreover, separation continues to improve with increasing primary fluor concentration, and signals are completely distinguishable according to one embodiment including about 30 wt % primary fluor. Of course, further increases in primary fluor concentration may be expected to further increase signal separation and hence PSD performance, but the inventors have observed that primary fluor concentrations above about 75 wt % may exhibit inhibitory effects on signal resolution and PSD performance. Accordingly, primary fluor concentrations in a range of about 10 wt % to about 75 wt % relative to the bulk weight of the scintillator material are preferred, in some approaches.

FIG. 10 further depicts the generally observed relationship between fluor concentration and PSD performance with particular reference to fraction of delayed light for both neutron and gamma radiation, according to one embodiment. As can be seen from FIG. 10, organic plastic scintillators as described herein and utilizing PPO as a primary fluor exhibit a direct relationship between PPO concentration and amount of delayed light, whether from gamma or neutron radiation. Accordingly, FOM values and corresponding PSD characteristics also improve with increasing primary fluor concentration, in some embodiments.

Accordingly, the fixed position of molecules in a polymer matrix indicate advantageous performance where the concentration of a fluor required for efficient PSD is closer to that in mixed crystals rather than in liquid solutions, in various approaches.

Digital Processing for Pulse Shape Discrimination

In one digital processing approach, signals corresponding to a subset of the events are selected and processed.

Yet another approach includes processing two or more integration windows (e.g., $0$-$\tau_1$, $\tau_1$-$\tau_2$), and employing this ratio to deduce a pulse shape discrimination factor, derived from each individual scintillation pulse.

In any approach, and particularly approaches utilizing digitization as described herein, the exemplary scintillator system employing an organic plastic polymer may further include additional components. In one embodiment, for example, the exemplary scintillator system may include a processor, e.g. for performing a discrimination method for processing an output of the photodetector using pulse shape discrimination for differentiating responses of the material to the neutron and gamma ray irradiation. In another embodiment, the exemplary scintillator system may additionally and/or alternatively include a photodetector, e.g. for detecting the response of the material to at least one of neutron and gamma ray irradiation. Of course, other components as would be understood by the skilled artisan reading the present descriptions may be included and/or excluded according to various approaches.

In various embodiments, digital processing for pulse shape discrimination may be performed substantially as described in U.S. patent application Ser. No. 13/024,066, filed Feb. 9, 2011, which is incorporated in its entirety herein by reference.

Thermal and Fast Neutron Discrimination

As noted above, various embodiments of the present invention describe polymer scintillator materials capable of simultaneous detection of thermal neutrons and fast neutrons discriminated from the gamma radiation background. Fabrication of such polymer scintillator materials is also discussed.

Experiments conducted with organic single crystals showed that addition of a thermal neutron capture component to a scintillator with PSD properties leads to its ability to produce three different shape pulses corresponding to the gamma, fast neutron and thermal neutron radiation ("triple" PSD). Further studies confirmed that similar phenomenon occurs in plastic scintillators capable of PSD. It was surprisingly and unpredictably found that, by following the teachings presented herein, it is now possible to incorporate capture nuclei in PSD plastic scintillators that now can detect and distinguish between thermal neutrons, fast neutrons, and gammas in one piece of material. Several advantages of plastics are that they can be manufactured as homogeneous, and optically transparent or translucent solids of various sizes and shapes that should prove very useful for the wide-spread use in radiation detection. Moreover, plastic scintillators in some embodiments may exhibit color when they are adapted for longer wavelength luminescence.

In various embodiments, plastic scintillators with "dual" PSD, such as any of the plastic scintillators described elsewhere herein, are loaded with at least one component selected from a group consisting of Lithium, Boron, Gadolinium, Lithium-containing compounds, Boron-containing compounds, and/or Gadolinium-containing compounds. The signal discrimination between fast neutrons and gamma rays is achieved, in some approaches, by the use of hydrogen-rich aromatic polymer matrices, such as but not limited to polyvinyltoluene (PVT) or polystyrene (PS), loaded with high concentration of scintillation dyes, such as but not limited to 2,5-diphenyloxazole (PPO). The short range of the energetic protons produced from neutron collisions, compared to the longer range of the electrons from the gamma interactions, leads to the higher proportions of the delayed light in the scintillation pulses produced by fast neutrons in comparison with the gamma-induced pulses. Heavier charged particles, such as alphas resulting from the capture reactions with $^6$Li or $^{10}$B produce an even greater fraction of delayed light, giving the basis for thermal neutron discrimination from both fast neutrons and gamma radiation background. Thermal neutron capture on Gd can be identified by detection of a cascade of gamma-rays amounting to total energy of about 8 MeV and/or characteristic capture time distributions (e.g., specific time correlations).

Figure 12A:
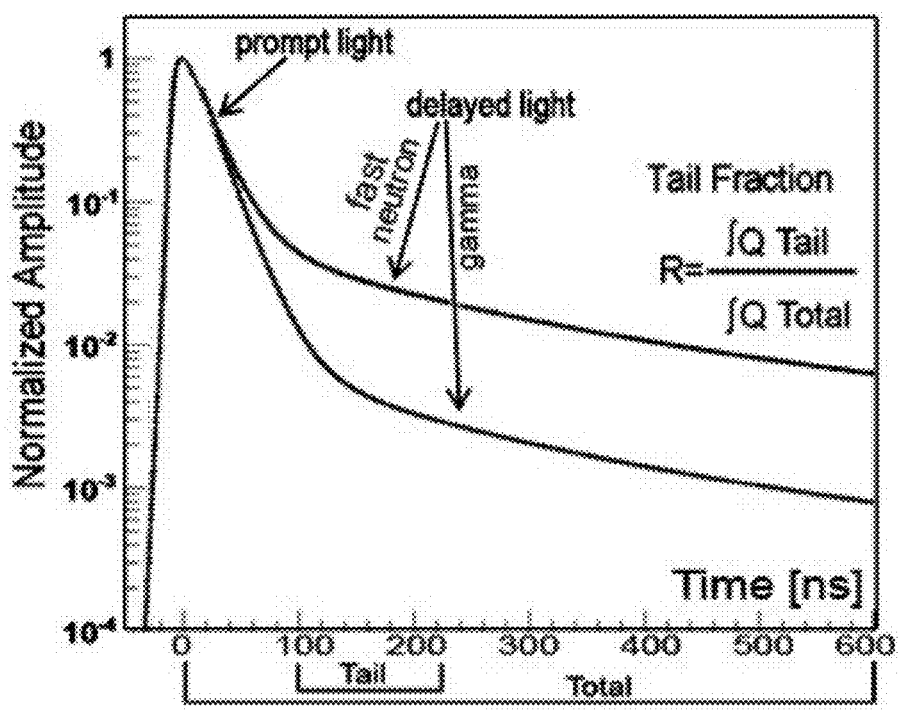
FIGS. 12A-B depict PSD output for a plastic scintillator that does not have Li, B or Gd therein.
Figure 12B:
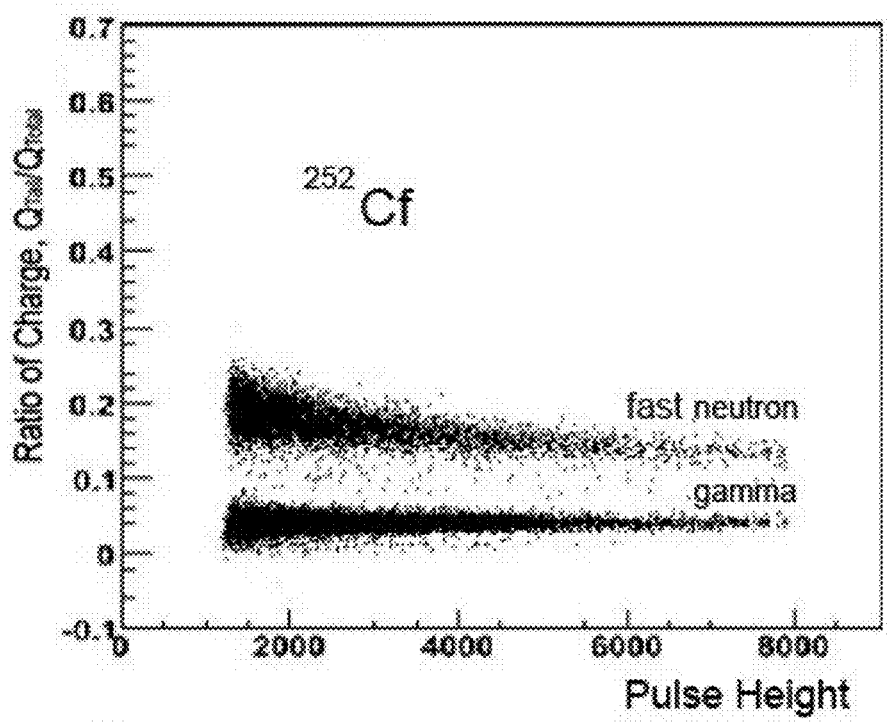
Figure 12C:
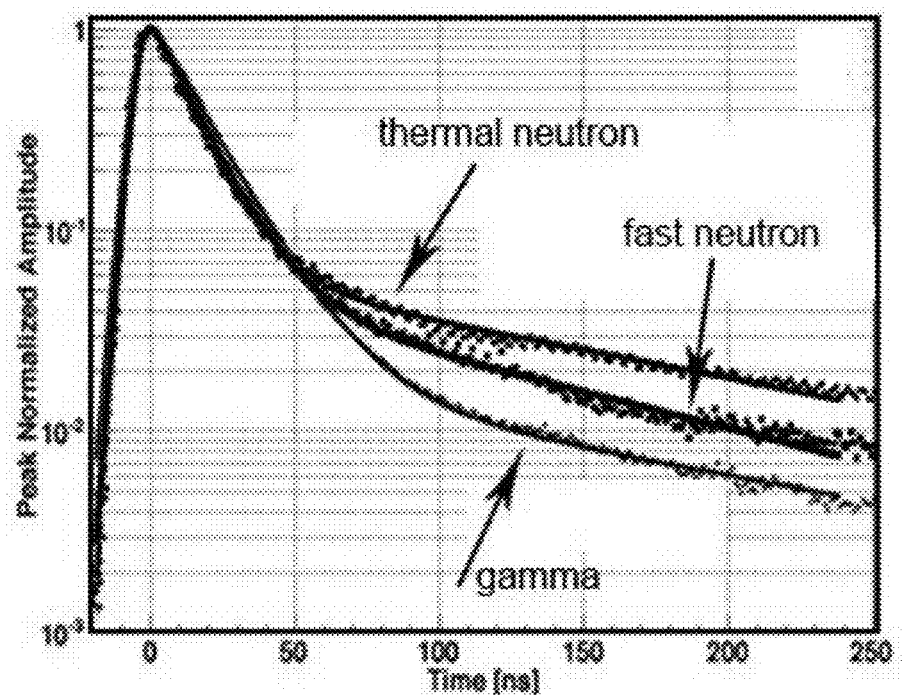
FIGS. 12C-D depict PSD output for a plastic scintillator material having Li therein according to one embodiment.
Figure 12D:
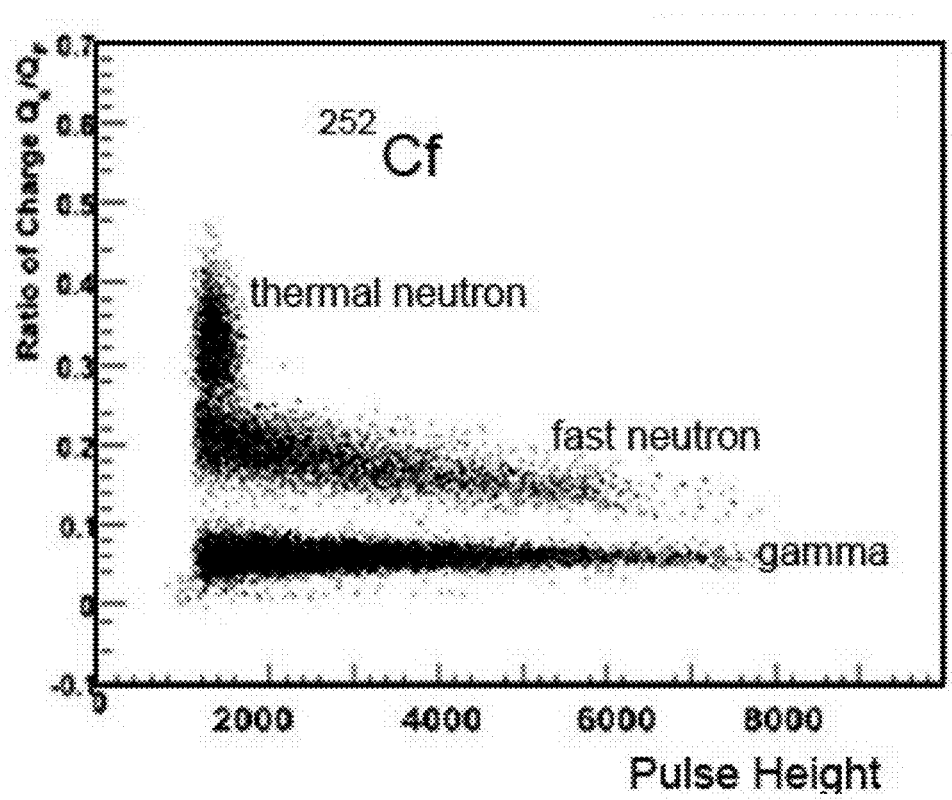

To further demonstrate, consider FIGS. 12A-12D, which illustrate different shapes of neutron and gamma scintillation pulses in a PSD scintillator (FIG. 12A) that does not have Li, B or Gd; and in a Lithium-containing PSD scintillator (FIG. 12C), and the corresponding digitally separated signals detected from neutrons and gamma scintillation pulses (FIGS. 12B and 12D, corresponding to FIGS. 12A and 12C, respectively).

A preferred way of detecting fast and thermal neutrons utilizes pulse-shape discrimination (PSD) with organic scintillators, which builds on the PSD mechanism for discriminating between fast neutrons and gammas described above. In general, PSD for discriminating between neutrons and gammas is based on the existence of two-decay component fluorescence, in which, in addition to the main component decaying exponentially (prompt fluorescence), there is usually a slower emission that has the same wavelength, but longer decay time (delayed emission). The short range of the energetic protons produced from neutron collisions, compared to the longer range of the electrons from the gamma interactions, leads to the different proportions of the delayed light in the scintillation pulses produced by neutrons and gammas. Heavier charged particles, such as alphas produce an even greater fraction of delayed light. Modern digital techniques enable easy separation of the pulses based on the ratio of charge between the signal integrals collected in the time gates corresponding to the prompt and delayed components of different shape pulses, e.g., as in FIG. 12A.

It has recently been demonstrated that detection of fast neutrons can be efficiently achieved with plastic scintillators capable of neutron-gamma PSD. Plastic scintillators are non-hazardous. They can be easily produced at different sizes and shape, in large volumes at low cost, which make them promising materials for potential replacement of liquid scintillators. When composed of pure, light-weight hydrocarbons, plastic scintillators provide fast neutron-gamma discrimination similar to that illustrated by FIGS. 12A and 12B.

However, thermal neutrons have lower energy, and so may not be detectable using the dual PSD plastic scintillators described above. Fortunately, as found in further studies, if certain additional components containing atoms with high thermal neutron cross-section are added to the composition of PSD organic scintillators, they gain the ability to simultaneously detect thermal neutrons and fast neutrons discriminated from each other and from the background gamma radiation.

The sensitivity of the new materials to thermal neutrons is based on one or more of the following capture reactions on such nuclei as $^{10}$B, $^6$Li, or Gd:

$^{10}B+n°=^7Li+\alpha+2.79$ MeV

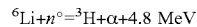
$^6Li+n°=^3H+\alpha+4.8$ MeV

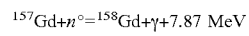
$^{157}Gd+n°=^{158}Gd+\gamma+7.87$ MeV

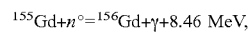
$^{155}Gd+n°=^{156}Gd+\gamma+8.46$ MeV,

Note that thermal neutron capture on Gd can be identified by detection of a cascade of gamma-rays amounting to total energy of about 8 MeV, or conversion electrons, mainly about 29 keV, and/or by characteristic capture time distributions.

Previous use of capture agents in combination with traditional plastic scintillators without PSD was based on identification of thermal neutrons via analysis of the total scintillation light generated due to the energy deposition by the reaction products and/or by capture time distributions. Absence of discrimination capabilities in such detectors led to ambiguity in detection of neutrons mixed with gamma-ray background. On the contrary, plastic scintillators with efficient PSD, such as those described elsewhere herein, and further loaded with thermal neutron capture components enable clear separation of scintillation pulses produced by thermal neutrons, fast neutrons and gamma rays, e.g., as depicted in FIGS. 12C and 12D. The use of the new materials described herein allows for simultaneous detection of thermal and fast neutrons discriminated from the gamma radiation background across a wider energy range. A unique possibility of wide-energy range neutron detection in one detector unit is to substantially simplify the design and use of radiation detectors, being especially beneficial for the processes requiring time correlated signals, such as, for example, neutron imaging, multiplicity information, or anti-neutrino detection. Due to the low cost and simplicity in large-scale manufacturing, such neutron detectors in some embodiments can be considered $^3$He replacement.

Of particular importance, many sources of radiation such as uranium and plutonium tend to produce fast neutrons. However, when a hydrogen-containing material such as a plastic is introduced, the hydrogen-containing material tends to slow or "thermalize" the fast neutrons, converting them to thermal neutrons.

The present scintillator material enables detection of both fast and thermal neutrons in one device. See, e.g., FIG. 3 and related description, above for an illustrative system which may be used with the scintillator material. Of course, those skilled in the art, upon being apprised of the teachings herein, will appreciate that any type of detection system may be adapted for use with the scintillator material. Moreover, a plastic shielding may be implemented in one embodiment to thermalize some of the incoming fast neutrons. In another approach, a lead-based shield may be implemented to reduce a number of gamma rays encountering the scintillator.

In general, the scintillator material may be fabricated as described elsewhere herein, with the exception that one or more components selected from: Li, B, Gd, a Li-containing compound, a B-containing compound, and/or a Gd-containing compound is added to the precursor mixture when forming the plastic scintillator. In another approach, the component may include at least two of B, Li and Gd.

The component may be added to the precursor mixture in any way. In one approach, the component is added as a solid or liquid and becomes entrained in the precursor materials via dissolution. For example, the solid may be a powder or dissolvable solid in some approaches. The liquid may be a suspension of the component in a fluid, a liquid-state compound of the component, etc. in various approaches. In another approach, the component is co-polymerized with other components in the precursor mixture to form the final material. One skilled in the art, upon reading the present disclosure, will appreciate that known B-, Li- and/or Gd-containing compounds may be utilized in various approaches to practice the invention without the need to resort to undue experimentation. Nonlimiting examples include B-carborane, organo-lithiums, organo-gadoliniums, etc. Likewise, elemental B, Li and/or Gd can be used in some approaches.

The component may be present in the scintillator material in an effective amount, defined as at least an amount that provides a detectable signature resulted from a capture reaction. In general, the amount of the component may be present from about 1/100 wt % (or lower) of the scintillator material up to a saturation amount in the precursor mixture. The resulting scintillator material includes the one or more components, and exhibits an optical response signature for thermal neutrons that is different than an optical response signature for fast neutrons and gamma rays. Where the scintillator material is based on a mixture that would otherwise provide only dual PSD between fast neutron and gammas in the absence of the component, the otherwise identical scintillator material with the component additionally exhibits an optical response signature for thermal neutrons that is different than an optical response signature for fast neutrons and gamma rays.

Figure 13A:
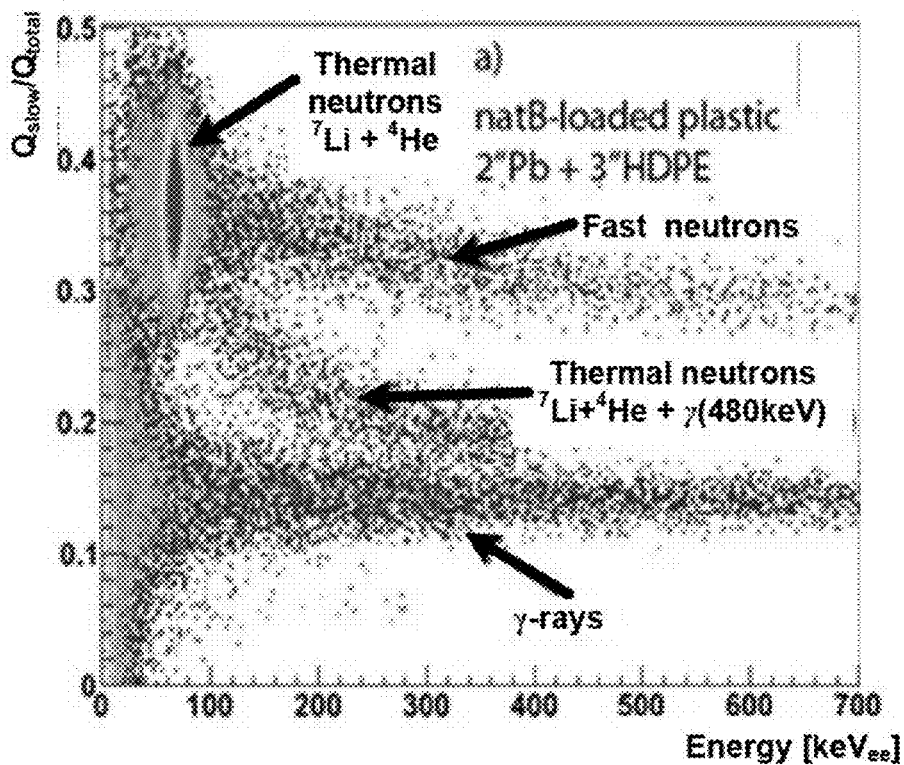
FIG. 13A depicts an experimental pattern having separated signatures of different types of radiation according to one embodiment.
Figure 13B:
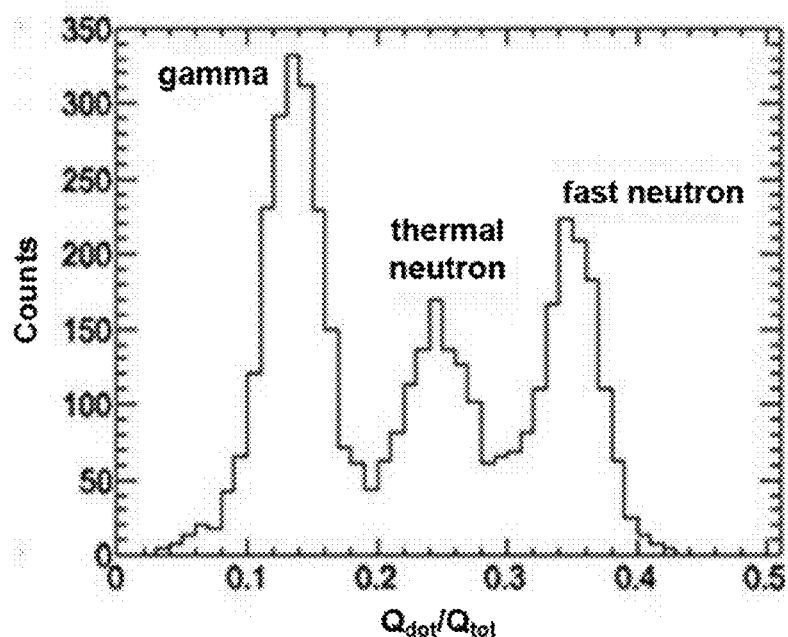
FIG. 13B depicts a PSD pattern showing simultaneous detection of mutually discriminated thermal neutrons, fast neutrons, and gammas in the energy range (250-320) keV$_{ee}$ obtained with a Boron-loaded PSD plastic according to one embodiment.

Particular benefits associated with plastic scintillator materials incorporating B, according to some embodiments, include the following:
  Triple Discrimination (fast neutrons, thermal neutrons, gamma-rays)
  Increased Neutron Efficiency
    higher cross-sections than $^6$Li
    higher solubility in precursor mixture than $^6$Li
  Moderate light efficiency for thermal neutron reaction products (e.g., 70 keVee) limits scintillator size
  Potential for moderate size detectors Particular benefits associated with plastic scintillator materials incorporating Li, according to some embodiments, include the following:
  Triple Discrimination (fast neutrons, thermal neutrons, gamma-rays)
  Higher Light Yield (less quenching)
  High light efficiency for thermal neutron reaction products (e.g., 450 keVee)
  Potential for large active volume detectors
  Potential for applications where fast neutrons are considered as background FIG. 13A depicts an experimental pattern having separated signatures of different types of radiation. Separated signatures of different types of radiation make it possible to establish presence of thermal neutrons, fast neutrons, and gamma rays detected in one piece of the new material. FIG. 13B depicts a PSD pattern showing simultaneous detection of mutually discriminated thermal neutrons, fast neutrons, and gammas in the energy range (250-320) keV$_{ee}$ obtained with a Boron-loaded PSD plastic.

The results shown in FIGS. 13A and 13B were obtained with a plastic scintillator comprised of polyvinyl toluene (PVT) with 28% of 2,5-diphenyloxazole (PPO), as primary fluorophore, 5% of meta-carborane, as thermal neutron capture agent, and 0.2% diphenylanthracene (DPA), as secondary fluorophore.

In one illustrative embodiment, which is not meant to be considered limiting in any way, a colorless, optically transparent PSD plastic for simultaneous detection of thermal and fast neutrons can by formed by combining:
  0.001-1% Luperox 231 (initiator);
  28-30% 2,5-diphenyloxazole (PPO), as primary fluorophore;
  0.1-2.0% a longer-wavelength compound, such as 9,10-diphenylanthracene (DPA), or 1,1',4,4'-tetraphenyl-1,3-butadiene (TPB), as secondary fluorophore;
  0.01-10% of any soluble or co-polymerizable component containing $^{10}$B, $^6$Li, or Gd.
  balance 4-methylstyrene or styrene precursor.

The materials are added to scintillation vials or glass jars, degassed prior to entrance into a glovebox under $N_2$ or Ar. Once the monomer of choice is added, the vessel is sealed and then placed in an oven at 50-95° C. under inert gas flow, and allowed to cure for 72-240 hrs., after which it is cooled to room temperature. The resulting polymer is rigid, transparent and offers excellent scintillation properties for pulse shape discrimination.

Applications and Uses

Embodiments of the present invention may be used in a wide variety of applications, and potentially any application in which high light yield and/or pulse shape discrimination between gammas, fast and thermal neutrons, charged particles, etc. is useful.

Illustrative uses of various embodiments of the present invention include, but are not limited to, applications requiring radiation detection. Detection, surveillance and monitoring of radioactive materials, including identification of special nuclear materials (SNM), are a few such examples. Various embodiments can also be used in the nuclear fuel cycle, homeland security applications, nuclear non-proliferation, medical imaging, special nuclear material, high energy physics facilities, etc. Moreover, the figure of merit (FOM) performance metric is already sufficient to distinguish neutrons from gammas down to the few hundred keV/gamma equivalent regime, and will be very useful for non-proliferation, homeland security and safeguards applications.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear device. Assessment of radiological dispersal devices is another application.

Further applications include radiography, dosimetry, and scientific research.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A scintillator material, comprising:
   a polymer matrix;
   a primary dye in the polymer matrix, the primary dye being a fluorescent dye, the primary dye being present in an amount ranging from 3 wt % to 40 wt %;
   a secondary dye present in an amount ranging from 1 wt % to 2 wt %, the secondary dye having a longer wavelength than the primary dye; and
   at least one component in the polymer matrix, the component being selected from a group consisting of B, Li, Gd, a B-containing compound, a Li-containing compound and a Gd-containing compound,
   wherein the scintillator material exhibits an optical response signature for thermal neutrons that is different than an optical response signature for fast neutrons and gamma rays,
   wherein the primary dye is crosslinked to the polymer matrix.

2. The scintillator material of claim 1, wherein the component includes the B-containing compound, the B-containing compound comprising metacarborane.

3. The scintillator material of claim 1, wherein the polymer matrix is a solid polymer matrix.

4. The scintillator material of claim 1, wherein the component includes at least two of B, Li, Gd, the B-containing compound, the Li-containing compound and the Gd-containing compound.

5. The scintillator material of claim 1, further comprising an initiator in the polymer matrix.

6. The scintillator material of claim 5, wherein the initiator is present in an amount of about 1 wt %.

7. The scintillator material of claim 1, wherein the scintillator material is configured to exhibit a pulse-shape discrimination (PSD) figure of merit (FOM) of about at least 3.0.

8. The scintillator material of claim 1, wherein the primary dye includes multiple types of fluorescent dyes.

9. A system, comprising:
   the scintillator material of claim 1,
   a photodetector for detecting the response of the material to fast neutron, thermal neutron and gamma ray irradiation; and
   a processor and logic integrated with and/or executable by the processor, the logic being configured to perform a discrimination method for processing an output of the photodetector using pulse shape discrimination for differentiating responses of the material to the fast neutron, thermal neutron and gamma ray irradiation.

10. A method for fabricating the scintillator material of claim 1, comprising:
    creating a solid structure comprising the polymer matrix having the primary dye and the component therein.

11. The scintillator material of claim 1, wherein the polymer matrix is selected from the group consisting of: polyvinyl tetrahydronaphthalene, polyvinyl diphenyl, polyvinyl xylene, and 2,4,5-trimethyl styrene.

12. The scintillator material of claim 1, wherein the component includes B and Li.

13. A scintillator material, comprising:
    a solid polymer matrix;
    a plurality of primary, fluorescent dyes in the polymer matrix, wherein a total amount of the plurality of primary, fluorescent dyes ranges from 3 wt % to 20 wt %;
    a secondary dye in the polymer matrix, wherein the secondary dye is present in amount ranging from 1 wt % to 2 wt %, wherein the secondary dye has a longer wavelength than each of the primary, fluorescent dyes; and
    at least one component in the polymer matrix, the component comprising elemental Li and/or elemental B,
    wherein the scintillator material exhibits an optical response signature for thermal neutrons, fast neutrons and gamma rays,
    wherein the optical response signature for the thermal neutrons, the optical response signature for the fast neutrons and the optical response signature for the gamma rays are separable from one another.

14. The scintillator material of claim 13, wherein the solid polymer matrix includes at least one of: polyvinyl tetrahydronaphthalene, polyvinyl diphenyl, polyvinyl xylene, and 2,4,5-trimethyl styrene.

15. The scintillator material of claim 13, wherein at least one of the primary, fluorescent dyes is crosslinked to the polymer matrix.

16. The scintillator material of claim 15, wherein the component comprises elemental Li and elemental B.

17. A method for fabricating a scintillator material, the method comprising:
    placing a precursor mixture in a heating vessel; and
    heating the precursor mixture until a polymerization process is complete, wherein the precursor mixture comprises:
    a monomer present in an amount ranging from about 60 wt % to about 95 wt %;
    a primary fluor present in an amount ranging from about 3 wt % to about 40 wt %;
    an initiator; and
    at least one component selected from a group consisting of B, Li, Gd, a B-containing compound, a Li-containing compound and a Gd-containing compound,
    wherein the precursor mixture further comprises a secondary fluor present in amount ranging from 1 wt % to 2 wt %.

18. The method of claim 17, wherein the precursor mixture is heated to a temperature of about 80° C.

* * * * *